(12) United States Patent
Miller et al.

(10) Patent No.: US 11,789,465 B2
(45) Date of Patent: Oct. 17, 2023

(54) SYSTEMS AND METHODS FOR CONTROLLING A VEHICLE

(71) Applicant: Georgia Tech Research Corporation, Atlanta, GA (US)

(72) Inventors: Michael Z. Miller, Atlanta, GA (US); Eric M. Feron, Atlanta, GA (US); Kayla Watson, Atlanta, GA (US); John B. Mains, Atlanta, GA (US); Thanakorn Khamvilai, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 375 days.

(21) Appl. No.: 16/973,993

(22) PCT Filed: Jan. 14, 2019

(86) PCT No.: PCT/US2019/037161
§ 371 (c)(1),
(2) Date: Dec. 10, 2020

(87) PCT Pub. No.: WO2019/241617
PCT Pub. Date: Dec. 19, 2019

(65) Prior Publication Data
US 2021/0124373 A1 Apr. 29, 2021

Related U.S. Application Data

(60) Provisional application No. 62/684,952, filed on Jun. 14, 2018.

(51) Int. Cl.
*G05D 1/08* (2006.01)
*B64C 17/02* (2006.01)
(Continued)

(52) U.S. Cl.
CPC .......... *G05D 1/0816* (2013.01); *B64C 17/02* (2013.01); *B64C 39/024* (2013.01); *B64U 10/13* (2023.01);
(Continued)

(58) Field of Classification Search
CPC .. G05D 1/0816; B64C 17/02; B64U 2201/10; B64U 30/20
See application file for complete search history.

(56) References Cited

U.S. PATENT DOCUMENTS 3,226,059 A * 12/1965 Paterson ............... B64C 39/024
244/17.17
5,996,933 A * 12/1999 Schier .................... B64C 39/06
244/17.11
(Continued)

FOREIGN PATENT DOCUMENTS

WO 2018/071592 4/2018

OTHER PUBLICATIONS

International Search Report and Written Opinion from Application No. PCT/US2019/037161 dated Dec. 4, 2019 (17 pages).

*Primary Examiner* — Richard G Davis
(74) *Attorney, Agent, or Firm* — Troutman Pepper Hamilton Sanders LLP; Ryan A. Schneider; Brandon M. Reed

(57) ABSTRACT

Certain examples of the present disclosure relate to systems and methods for controlling a vehicle. In particular, the present disclosure provides systems and methods for moving an aerial vehicle by decoupling the pitch- and roll-movement from thrust production. This decoupling can occur by shifting the center of gravity of the vehicle to create a moment about a desired axis. Some examples describe single-shaft rotary vehicles, while other examples describe coaxial rotary vehicles. The vehicles described herein may include a first mass moveable from a first position to a (Continued)

second position to create at least one of a rolling moment or a pitching moment to alter the direction of movement of the vehicle. A second mass may also be provided to alter the rolling moment or pitching moment. Methods for controlling the vehicles are also provided herein.

19 Claims, 10 Drawing Sheets

(51) Int. Cl.
  *B64C 39/02* (2023.01)
  *B64U 10/13* (2023.01)
  *B64U 30/20* (2023.01)
(52) U.S. Cl.
  CPC .......... *B64U 30/20* (2023.01); *B64U 2201/00* (2023.01); *B64U 2201/10* (2023.01)

(56) References Cited

U.S. PATENT DOCUMENTS

| | | | |
|---|---|---|---|
| 9,469,394 B2* | 10/2016 | Vaughn | B64C 39/024 |
| 9,550,561 B1* | 1/2017 | Beckman | G01M 1/127 |
| 9,908,619 B1* | 3/2018 | Beckman | B64C 39/024 |
| 10,814,968 B2* | 10/2020 | Gamble | B64C 27/52 |
| 2010/0044499 A1 | 2/2010 | Dragan et al. | |
| 2011/0290937 A1* | 12/2011 | Salkeld | B64C 17/04 |
| | | | 348/E7.085 |
| 2016/0059958 A1 | 3/2016 | Kvitnevskiy | |
| 2016/0272310 A1 | 9/2016 | Chan et al. | |
| 2017/0163896 A1 | 6/2017 | Kang et al. | |
| 2018/0141647 A1* | 5/2018 | Suzuki | B64U 50/13 |
| 2019/0039721 A1* | 2/2019 | Liu | B64F 5/50 |
| 2019/0276140 A1* | 9/2019 | Poltorak | B64C 39/024 |
| 2020/0164966 A1* | 5/2020 | Suzuki | B64C 17/02 |

* cited by examiner

SYSTEMS AND METHODS FOR CONTROLLING A VEHICLE

CROSS-REFERENCE TO RELATED APPLICATIONS

This application claims priority to U.S. Provisional Patent Application No. 62/684,952, filed 14 Jun. 2018, which is hereby incorporated by reference herein in its entirety as if fully set forth below.

FIELD OF THE DISCLOSURE

Embodiments of the present disclosure relate to vehicle control systems and, more particularly, to systems and methods for controlling a vehicle by shifting the center of gravity of the vehicle to create a moment to alter the direction of movement of the vehicle.

BACKGROUND

In recent years, there has been a large increase in the popularity of Unmanned Aerial Vehicles (UAVs), which are sometimes referred to as drones. A popular type of UAV, especially in the commercial market, is the quadcopter, which has four independent rotor systems that are used to control the UAV. This control includes pitch, roll, and yaw maneuverability. Quadcopters perform these maneuvers by varying the thrust generated by one or more of the rotor systems. For example, to roll the vehicle to the right, the vehicle requires a net torque that rolls the vehicle in that direction. Accordingly, in present systems, the revolutions per minute of the two left-side rotor systems can be increased to roll the system to the right.

However, this type of control results in several inefficiencies that are inherent with the quadcopter design. One inefficiency is the need for four rotors, four motors, and four Electronic Speed Controllers (ESCs) in order to achieve control of the quadcopter. This is because the roll- and pitch-control of the vehicles are coupled to thrust production. This coupling of the thrust and position control increases the weight of the vehicle and decreases the efficiency of the system, i.e., four separate motors require power, thus limiting the range of the vehicle's flight.

Another type of rotary vehicle is the coaxial vehicles. These vehicles include a power source that provides rotary power to two separate rotary systems. The two rotary systems operate in a contra-rotary manner, i.e., the first rotary system rotates in a first direction and the second rotary system rotates in a second, opposite direction. Current coaxial vehicles also couple thrust and position control. For example, these rotary systems include complex mechanical systems, such as swashplates and coaxial hubs, to alter the direction of the vehicle by altering the lift produced at different sides of the vehicle. For example, the swashplate can tilt and alter the pitch of propellers on the rotary systems such that one side of the rotary system produces a greater lift than the other side of the system. These mechanical components are not only complex, but they also have significant weight and drag penalties. These and other concerns exist with present rotary systems.

SUMMARY

Embodiments of the present disclosure address these concerns as well as other needs that will become apparent upon reading the description below in conjunction with the drawings. Briefly described, embodiments of the present disclosure relate to vehicle control systems and, more particularly, to systems and methods for controlling a vehicle by shifting the center of gravity of the vehicle to create a moment to alter the direction of movement of the vehicle.

An exemplary embodiment of the present invention provides a vehicle control system for controlling a direction of movement of a vehicle. The system can include a first rotary shaft connected to the vehicle. The system can include a first plurality of propellers connected to the first rotary shaft. The system can include a first power source in mechanical communication with the first rotary shaft and configured to rotate the first rotary shaft. The system can include a first mass moveable from a first position to a second position. A movement of the first mass from the first position to the second position can create a moment, for example at least one of a rolling moment or a pitching moment, to alter the direction of movement of the vehicle.

In any of the embodiments described herein, the system can include a second rotary shaft connected to the vehicle. The system can include a second plurality of propellers connected to the second rotary shaft. The first and second rotary shafts can be coaxial. The first power source can be in mechanical communication with the second rotary shaft. The first power source can be configured to rotate the first rotary shaft in a first direction and can be configured to rotate the second rotary shaft in a second direction. The first direction can be opposite the second direction.

In any of the embodiments described herein, the system can include a second rotary shaft connected to the vehicle. The system can include a second plurality of propellers connected to the second rotary shaft. The system can include a second power source in mechanical communication with the second rotary shaft and configured to rotate the second rotary shaft.

In any of the embodiments described herein, the first plurality of propellers can be coplanar with the second plurality of propellers.

In any of the embodiments described herein, the first mass can be moveable from the first position to the second position along a first length. The system can include a second mass movable from a third position to a fourth position along a second length. A movement of the second mass from the third position to the fourth position can change the moment, for example the at least one of the rolling moment or the pitching moment.

In any of the embodiments described herein, the first mass can comprise a linear motor. The linear motor can be configured to move the first mass from the first position to the second position.

In any of the embodiments described herein, the first mass can comprise a first linear motor. The first linear motor can be configured to move the first mass from the first position to the second position along a first length. The second mass can comprise a second linear motor. The second linear motor can be configured to move the second mass from the third position to the fourth position along a second length.

In any of the embodiments described herein, the system can include a transceiver in electrical communication with the first power source. The transceiver can be configured to receive a wireless signal to adjust an angular velocity of the first plurality of propellers.

In any of the embodiments described herein, the system can include a transceiver in electrical communication with the first power source and the linear motor. The transceiver can be configured to receive a wireless signal to adjust an angular velocity of the first plurality of propellers. The transceiver can be configured to receive a wireless signal to move, via the linear motor, the first mass from the first position to the second position.

Another exemplary embodiment of the present invention provides a vehicle control system for controlling a direction of movement of a vehicle. The system can include a coaxial power source in mechanical communication with a first plurality of propellers and a second plurality of propellers. The system can include a first mass moveable from a first position to a second position. The coaxial power source can provide contra-rotary power to the first plurality of propellers and the second plurality of propellers. A movement of the first mass from the first position to the second position can create a moment, for example at least one of a rolling moment or a pitching moment, to alter the direction of movement of the vehicle.

In any of the embodiments described herein, the first mass can be moveable from the first position to the second position along a first length. The system can include a second mass moveable from a third position to a fourth position along a second length. A movement of the second mass from the third position to the fourth position can change the moment, for example the at least one of the rolling moment or the pitching moment.

In any of the embodiments described herein, the first mass can comprise a linear motor. The linear motor can be configured to move the first mass from the first position to the second position.

In any of the embodiments described herein, the first mass can comprise a first linear motor. The first linear motor can be configured to move the first mass from the first position to the second position along a first length. The second mass can comprise a second linear motor. The second linear motor can be configured to move the second mass from the third position to the fourth position along a second length.

In any of the embodiments described herein, the system can include a transceiver in electrical communication with the coaxial power source. The transceiver can be configured to receive a wireless signal to adjust an angular velocity of at least one of the first plurality of propellers or the second plurality of propellers.

In any of the embodiments described herein, the wireless signal can include instructions to adjust the angular velocity of the first plurality of propellers independently from the second plurality of propellers.

In any of the embodiments described herein, the system can include a transceiver in electrical communication with the coaxial power source and the linear motor. The transceiver can be configured to receive a wireless signal to adjust an angular velocity of at least one of the first plurality of propellers or the second plurality of propellers. The transceiver can be configured to receive a wireless signal to move, via the linear motor, the first mass from the first position to the second position.

Another exemplary embodiment of the present invention provides a rotary-powered vehicle. The vehicle can include a propulsion system. The propulsion system can include a first rotary shaft connected to the vehicle. The propulsion system can include a first plurality of propellers connected to the first rotary shaft. The propulsion system can include a first power source in mechanical communication with the first rotary shaft and configured to rotate the first rotary shaft. The vehicle can include a first mass moveable from a first position to a second position. A movement of the first mass from the first position to the second position can create a moment, for example at least one of a rolling moment or a pitching moment, to alter a direction of movement of the vehicle.

In any of the embodiments described herein, the propulsion system can include a second rotary shaft connected to the vehicle. The propulsion system can include a second plurality of propellers connected to the second rotary shaft. The first and second rotary shafts can be coaxial. The first power source can be in mechanical communication with the second rotary shaft. The first power source can be configured to rotate the first rotary shaft in a first direction and can be configured to rotate the second rotary shaft in a second direction. The first direction can be opposite the second direction.

In any of the embodiments described herein, the propulsion system can include a second rotary shaft connected to the vehicle. The propulsion system can include a second plurality of propellers connected to the second rotary shaft. The propulsion system can include a second power source in mechanical communication with the second rotary shaft and configured to rotate the second rotary shaft.

In any of the embodiments described herein, the first plurality of propellers can be coplanar with the second plurality of propellers.

In any of the embodiments described herein, the first mass can be moveable from the first position to the second position along a first length. The system can include a second mass movable from a third position to a fourth position along a second length. A movement of the second mass from the third position to the fourth position can change the moment, for example the at least one of the rolling moment or the pitching moment.

In any of the embodiments described herein, the first mass can comprise a linear motor. The linear motor can be configured to move the first mass from the first position to the second position.

In any of the embodiments described herein, the first mass can comprise a first linear motor. The first linear motor can be configured to move the first mass from the first position to the second position along a first length. The second mass can comprise a second linear motor. The second linear motor can be configured to move the second mass from the third position to the fourth position along a second length.

In any of the embodiments described herein, the vehicle can include a transceiver in electrical communication with the first power source. The transceiver can be configured to receive a wireless signal to adjust an angular velocity of the first plurality of propellers.

In any of the embodiments described herein, the vehicle can include a transceiver in electrical communication with the first power source and the linear motor. The transceiver can be configured to receive a wireless signal to adjust an angular velocity of the first plurality of propellers. The transceiver can be configured to receive a wireless signal to move, via the linear motor, the first mass from the first position to the second position.

In any of the embodiments described herein, the vehicle can include a movement-system frame. The propulsion system and the first mass can be connected to the movement-system frame.

In any of the embodiments described herein, the vehicle can include a base frame hingeably connected to the movement-system frame such that the movement-system frame can move independently from the base frame.

Another exemplary embodiment of the present invention provides a method of operating a rotary-powered vehicle. The method can include rotating, via a first power source, a first rotary shaft such that a first plurality of propellers connected to the first rotary shaft move at a first angular velocity. The method can include receiving, via a transceiver, a first signal, wherein the first signal includes instructions to move a first mass from a first position to a second position. The method can include moving the first mass from the first position to the second position, wherein the movement of the first mass from the first position to the second position creates a moment, for example at least one of a rolling moment or a pitching moment. The method can include adjusting at least one of a roll or a pitch of at least a portion of the rotary-powered vehicle to alter a direction of movement of the vehicle.

In any of the embodiments described herein, the first mass can be moveable from the first position to the second position along a first length. The first signal can include instructions to move a second mass from a third position to a fourth position along a second length. The method can include moving the second mass from the third position to the fourth position. The movement of the second mass from the third position to the fourth position can alter the moment, for example the at least one of the rolling moment or the pitching moment.

In any of the embodiments described herein, the method can include rotating, via a second power source, a second rotary shaft such that a second plurality of propellers connected to the second rotary shaft move at a second angular velocity.

In any of the embodiments described herein, the method can include receiving, via the transceiver, a second signal. The second signal can include instructions to adjust at least one of the first angular velocity or the second angular velocity.

In any of the embodiments described herein, the first plurality of propellers and the second plurality of propellers can be coaxial.

In any of the embodiments described herein, the first plurality of propellers can be coplanar with the second plurality of propellers.

In any of the embodiments described herein, In any of the embodiments described herein, the first plurality of propellers and the second plurality of propellers can be coaxial.

In any of the embodiments described herein, the first signal can be a wireless signal.

In any of the embodiments described herein, at least one of the first signal or the second signal can be a wireless signal.

In any of the embodiments described herein, the first mass can be moved from the first position to the second position via a linear motor.

In any of the embodiments described herein, the first mass can be moved from the first position to the second position via a first linear motor, and the second mass can be moved from the third position to the fourth position via a second linear motor.

Another exemplary embodiment of the present invention provides a method of controlling a rotary-powered vehicle. The method can include receiving, at a flight controller, a reference trajectory comprising a reference attitude and a reference position. The reference attitude can include a reference angular velocity for a first rotary shaft of a vehicle and a reference angular acceleration for the first rotary shaft. The method can include receiving, at a state-estimator controller, data indicative of an attitude and a position of the vehicle. The method can include tracking, via a position controller, the reference position. The method can include calculating a first set of instructions, based at least in part on the reference position, to adjust a position of the vehicle. The method can include adjusting, based at least in part on the first set of instructions, a position of a first mass on the vehicle to alter the position of the vehicle. The method can include tracking, via an attitude controller, the reference angular velocity for the first rotary shaft and the reference angular acceleration for the first rotary shaft.

In any of the embodiments described herein, the method can further include calculating a second set of instructions, based at least in part on the reference angular velocity for the first rotary shaft or the reference angular acceleration for the first rotary shaft, to adjust at least one of a first-rotary-shaft angular velocity or a first-rotary-shaft angular acceleration. The method can include adjusting, via a first power source and based at least in part on the second set of instructions, at least one of the first-rotary-shaft angular velocity or the first-rotary-shaft angular acceleration. The method can include receiving, at an actuator controller, at least one of a desired position, a desired speed, or a desired attitude for the vehicle. The method can include calculating a third set of instructions, based at least in part on the desired position, the desired speed, or the desired attitude, to alter at least one of the position of the vehicle, the first-rotary-shaft angular velocity, or the first-rotary-shaft angular acceleration. The method can include adjusting, based at least in part on the third set of instructions, the position of the first mass on the vehicle to alter the position of the vehicle. The method can include adjusting, via the first power source and based at least in part on the third set of instructions, at least one of the first-rotary-shaft angular velocity or the first-rotary-shaft angular acceleration.

In any of the embodiments described herein, the method can include adjusting, based at least in part on the first set of instructions, a position of a second mass to alter the vehicle position. The method can include adjusting, based at least in part on the third set of instructions, the position of the second on the vehicle to alter the position of the vehicle.

In any of the embodiments described herein, the second set of instructions can further be based at least in part on the reference angular velocity for the second rotary shaft or the reference angular acceleration for the second rotary shaft. The second set of instructions can include instructions to adjust at least one of a second-rotary-shaft angular velocity or a second-rotary-shaft angular acceleration. The method can further include tracking, via the attitude controller, the reference angular velocity for the second rotary shaft and the reference angular acceleration for the second rotary shaft. The method can include adjusting, via the first power source and based at least in part on the second set of instructions, at least one of the second-rotary-shaft angular velocity or the second-rotary-shaft angular acceleration. The method can include calculating a fourth set of instructions, based at least in part on the desired position, the desired speed, or the desired attitude, to alter at least one of the second-rotary-shaft angular velocity or the second-rotary-shaft angular acceleration. The method can include adjusting, based at least in part on the fourth set of instructions, the second-rotary-shaft angular velocity or the second-rotary-shaft angular acceleration.

These and other aspects of the present disclosure are described in the Detailed Description below and the accompanying figures. Other aspects and features of embodiments of the present disclosure will become apparent to those of ordinary skill in the art upon reviewing the following description of specific, example embodiments of the present disclosure in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the disclosure discussed herein. In similar fashion, while example embodiments may be discussed below as device, system, or method embodiments, it is to be understood that such example embodiments can be implemented in various devices, systems, and methods of the present disclosure.

BRIEF DESCRIPTION OF THE DRAWINGS

Reference will now be made to the accompanying figures and diagrams, which are not necessarily drawn to scale, and wherein.

DETAILED DESCRIPTION

Figure 1:
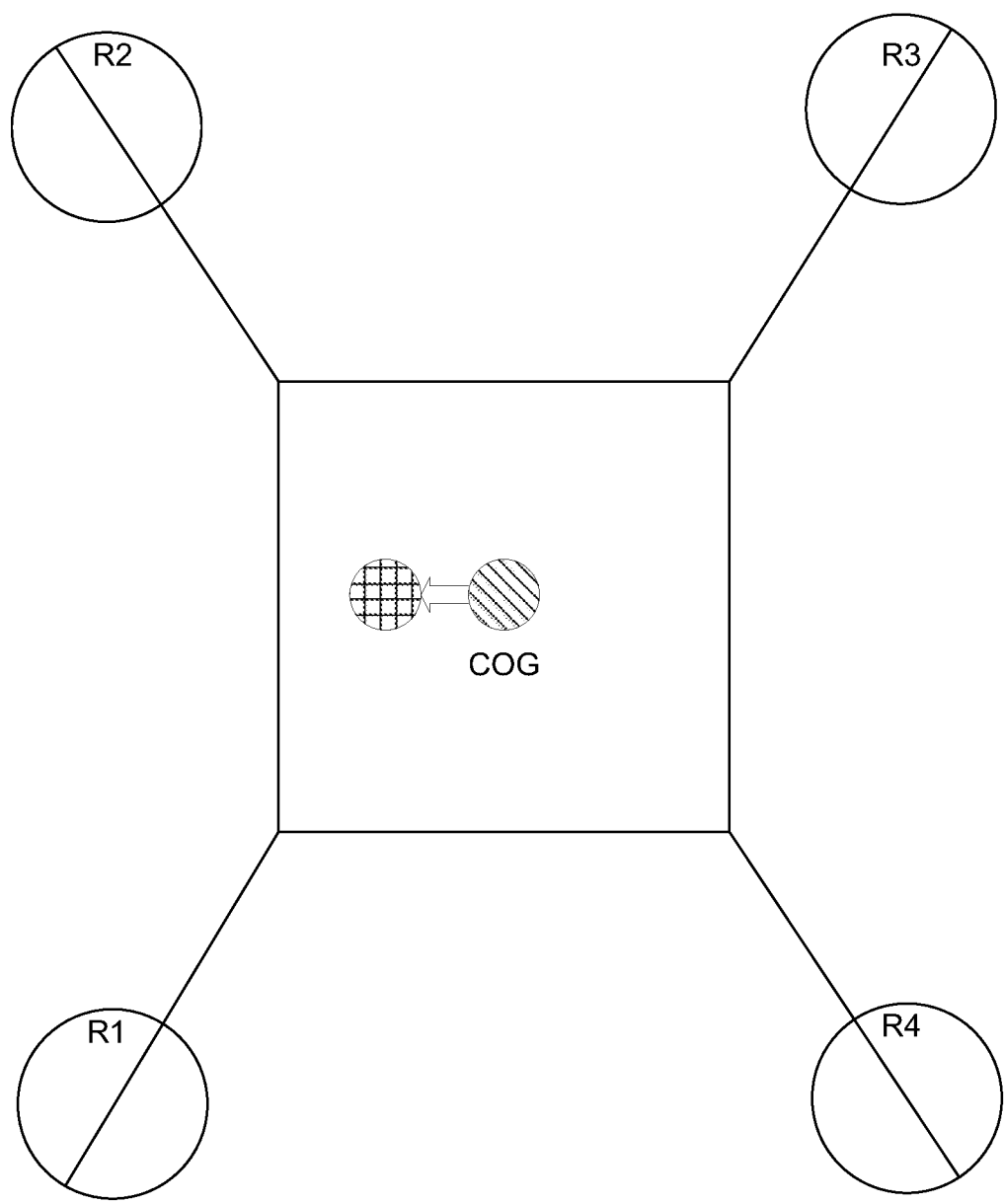
FIG. 1 is an illustrative diagram of an exemplary quadcopter design with a moving center of gravity, according to some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

To facilitate an understanding of the principles and features of the disclosure, various illustrative embodiments are explained below. In particular, the presently disclosed subject matter is described in the context of systems and methods for controlling a vehicle by shifting the center of gravity of the vehicle to create a moment, e.g., a rolling or pitching moment, to alter the direction of movement of the vehicle. The present disclosure describes moving rotary-based vehicles, including but not limited to quadcopters, helicopters, and the like. The present disclosure, however, is not so limited and can be applicable in other contexts. For example, and not limitation, the systems and method described herein may also apply to controlling vehicles in other contexts. For example and not limitation, the present systems and methods may improve control over other vehicles, such as water-based and land-based vehicles. Additionally, some embodiments are described in the context of Unmanned Aerial Vehicles, including drones. The present systems and methods are not so limited. For example, the systems and methods for controlling vehicle movement described herein are scalable and can apply to other aerial vehicles, including but not limited to manned rotary aircrafts. These embodiments are contemplated within the scope of the present disclosure. Accordingly, when the present disclosure is described in the context of systems and methods for controlling a vehicle by shifting the center of gravity of the vehicle to create a moment, e.g., rolling or pitching moment, it will be understood that other embodiments can take the place of those referred to.

As described above, two common vehicle-drive systems for operating rotary-powered aircrafts are the quadcopter design and the coaxial rotary design. The quadcopter design produces pitch and roll movement by increasing the thrust at respective sides of the vehicle. This increase in thrust is produced by independently changing the revolutions per minute (RPMs) of the rotor systems at different sides of the vehicle. The RPMs are manipulated by increasing the power provided by one or more of the four independent motors in the design. The coaxial rotary design produces pitch and roll movement by increasing the thrust from the propellers at different sides of the vehicle via swashplates; the swashplates change the pitch of the propellers at respective sides of the vehicle. Therefore, both designs couple vehicle movement with thrust production. This coupling disadvantageously decreases the vehicle's efficiency, increases the overall weight of the vehicle, and increases the power consumption of the vehicle-propulsion system.

The present disclosure provides a novel method of moving an aerial vehicle by decoupling the pitch- and roll-movement from thrust production. This decoupling can occur by shifting the center of gravity of the vehicle, or the vehicle's propulsion system, to create a moment about a desired axis. These systems and methods can be used in either single-rotor systems or coaxial-rotor systems. For example, in a coaxial-rotor system, the yaw can be controlled by varying the speed of the two coaxial rotors independently. In a single-rotor system, a tail rotor can be used to create the yaw movement.

As described above, to provide a rolling or pitching movement for a vehicle, a net torque is used to either roll or pitch the vehicle. Legacy systems created this torque by changing the direction of the force. However, torque can also be created by changing the moment-arm of the system about the rotors. For example, the torque on a system can be defined as:

$$\vec{T} = \vec{F} \times \vec{r} \qquad \text{Equation 1}$$

Previous systems changed the overall torque $\vec{T}$ of the vehicle by changing the force $\vec{F}$. However, as seen in Equation 1, the overall torque can also be changed by manipulating the moment arm $\vec{r}$ of the system. FIG. 1 provides an illustrative example of how moment arms may be altered to create a roll or pitch movement. FIG. 1 depicts an exemplary quad copter with four rotors (R1-R4). By moving the center of gravity to the left, the torque about the center of mass produced by R3 and R4 is greater than the torque produced by R1 and R2. This is due to the increased moment arm. Accordingly, the shift of the center of gravity (CoG) to the left will create a net torque rolling the quadcopter to the left. It will be understood that FIG. 1 is illustrative of one rotary vehicle design, namely a quadcopter. The present disclosure, however, is not limited to quadcopters. FIG. 1 is merely illustrative of how adjusting the CoG may alter the net torque about the vehicle.

The approach illustrated in FIG. 1 represents a new way of controlling a quadcopter. The moment-altering design described in FIG. 1, however, can be equally applied in the context of a single-rotor system (or a single coaxial-rotor system). The present disclosure describes systems and methods that implement this moment-creating design into various vehicle-control systems.

Various devices and methods are disclosed for providing systems and methods for controlling a vehicle by shifting the center of gravity of the vehicle, and exemplary embodiments of the devices and methods will now be described with reference to the accompanying figures.

Figure 2:
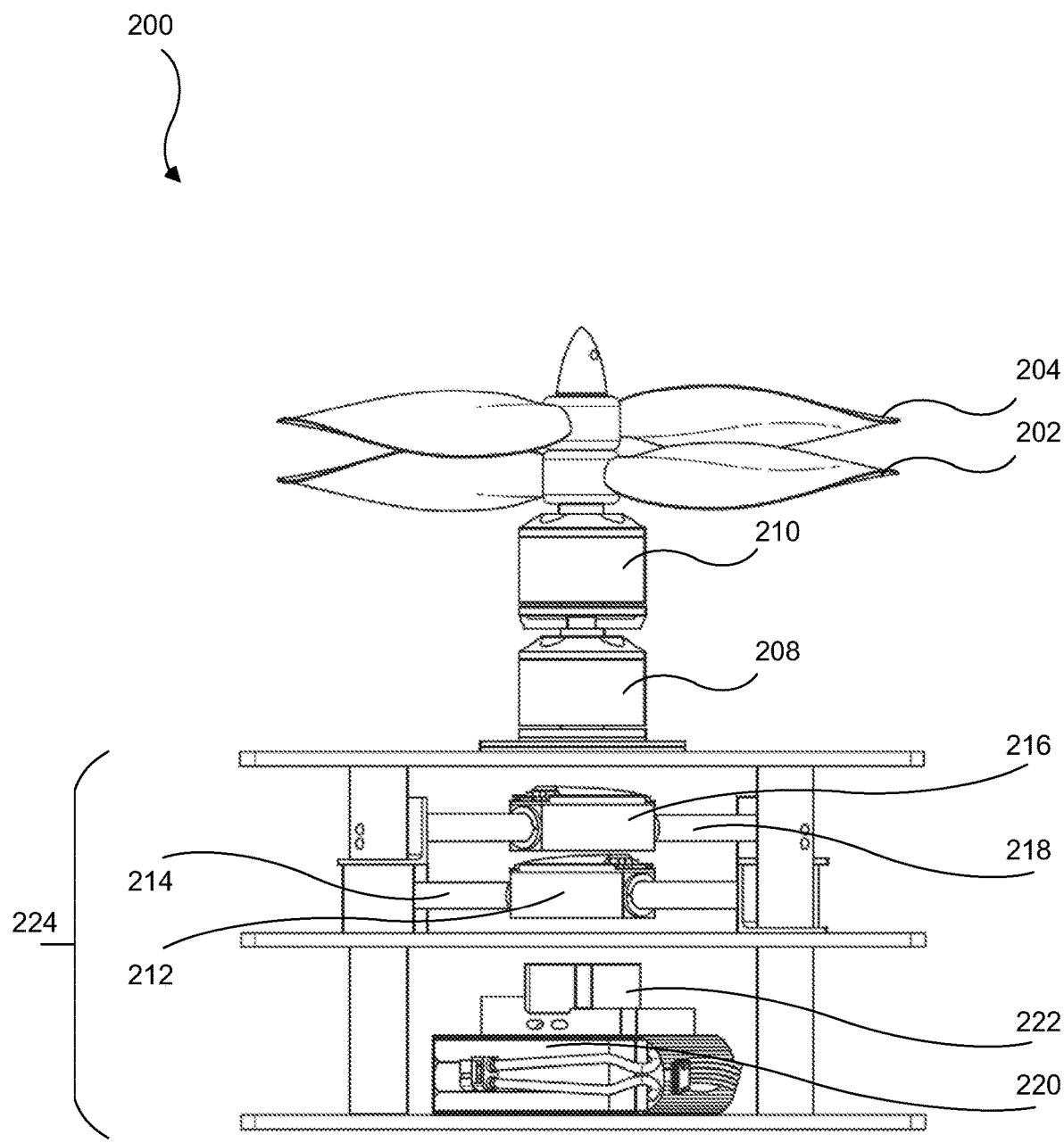
FIG. 2 is a perspective view of an exemplary vehicle control system, according to some embodiments of the present disclosure.
Figure 3:
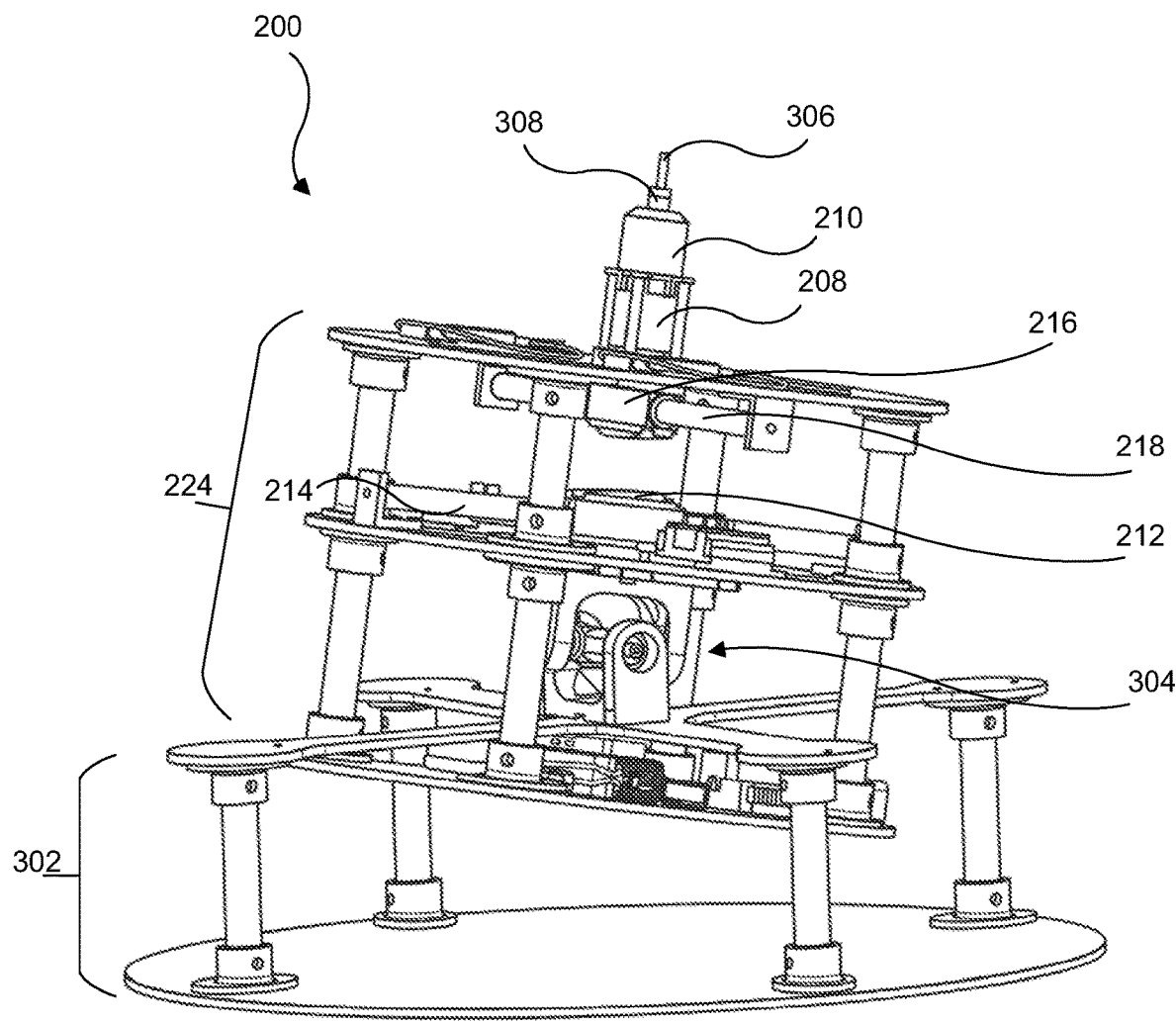
FIG. 3 is a perspective view of an exemplary vehicle control system with a hingeably connected base frame, according to some embodiments of the present disclosure.
Figure 5:
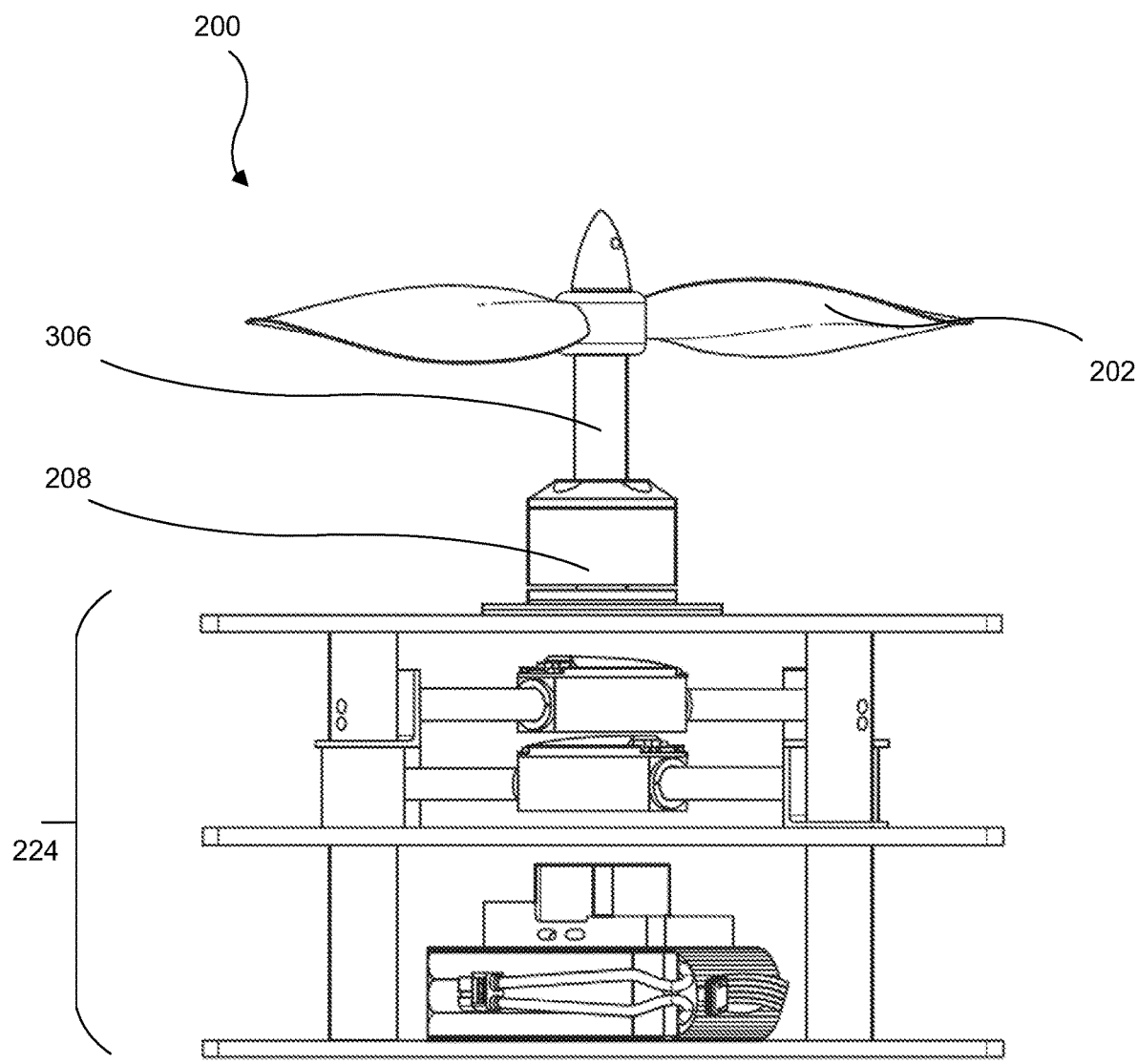
FIG. 5 is a perspective view of an exemplary vehicle control system, according to some embodiments of the present disclosure.

FIG. 2 is a perspective view of an exemplary vehicle control system 200, according to some embodiments of the present disclosure. FIG. 2 depicts a coaxial system, which is in accordance with some embodiments. A vehicle control system 200 may include a first plurality of propellers 202. A vehicle control system 200 may include a second set of propellers 204. The first plurality of propellers 202 and/or second plurality of propellers 204 can be connected to the vehicle control system 200 via respective rotary shafts, as will be appreciated. Exemplary rotary shafts are depicted in FIGS. 3 and 5. The first plurality of propellers 202 and/or second plurality of propellers 204 may include two blades, as shown in the figure. However, the plurality of propellers 202, 204 may include additional blade constructs, such as three-blade constructs, four-blade constructs, and similar constructs, as will be appreciated.

In some embodiments, the first plurality of propellers 202 and/or second plurality of propellers 204 can receive power from a first power source 208. In some embodiments, the first power source 208 may comprise an electric motor, internal combustion engine, and/or similar power-producing components that can provide rotary power. In some embodiments, the first power source 208 may be brushed direct current electric motor, a brushless direct current (BLDC) electric motor, or similar electric motors. In some embodiments, a BLDC motor may be used as a first power source 208 so as to decrease the weight of the aerial vehicle. The first power source 208 may provide power to rotate one of the first plurality of propellers 202 and/or second plurality of propellers 204. In some embodiments, a first power source 208 may include a contra-rotating motor with two separate shafts. As will be appreciated, a single contra-rotating motor may provide two coaxial rotary shafts, and the single motor can rotate a first shaft (and a first plurality of propellers 202) in one direction and rotate a second shaft (and a second plurality of propellers 204) in a second direction, wherein the first direction is opposite the second direction.

In some embodiments, the first plurality of propellers 202 and/or second plurality of propellers 204 can receive power from a second power source 210. For example, FIG. 2 depicts a vehicle control system 200 having a first power source 208 stacked below a second power source 210, which is in accordance with some embodiments. The second power source 210 may comprise an electric motor, internal combustion engine, and/or similar power-producing components that can produce rotary power. An electric motor of a second power source 210 can be similar to the electric motors described above for the first power source 208.

As will be appreciated, a first power source 208 and a second power source 210 can be stacked as shown to create a coaxial power source. In these embodiments, the first power source 208 may include a first rotary shaft and the second power source 210 may include a second rotary shaft. The first and second rotary shafts can be coaxial so as to provide the stacked propeller 202, 204 construct, as shown. It is also contemplated, however, that the second power source 210 is not stacked and coaxial with the first power source 208. For example, the second power source 210 may be planar with the first power source 208, similar to a quadcopter design. In these embodiments, the respective shafts in mechanical communication with the first power source 208 and the second power source 210 would not be coaxial. It is also contemplated that, in embodiments wherein the first power source 208 and the second power source 210 are not coaxial, a first plurality of propellers 202 connected to a first power source 208 and second plurality of propellers 204 connected to a second power source 210 can be coplanar.

It is contemplated that a vehicle control system 200 can include more than two power sources 208, 210. For example, a single vehicle control system can include three, four, or more power sources. A quadcopter, for example, has four separate power sources. It is also contemplated that a vehicle could have more than one stacked, coaxial construct. For example, the stacked first power source 208 and second power source 210 in FIG. 1 could be repeated elsewhere on the vehicle control system 200.

As described above, unlike previous designs, the presently-described systems and methods decouple the movement of the vehicle from the thrust production. The components described thus far would be considered to be a part of vehicle thrust production, or a propulsion system. For example, the first plurality of propellers 202, second plurality of propellers 204, power sources 208, 210, and similar components provide thrust to the system and are considered a part of the propulsion system. The additional features descried for FIG. 2 include components that alter the moment arms, thus providing movement for the vehicle control system 200.

In some embodiments, a vehicle control system 200 may include a first mass 212. The first mass 212 may be used to shift the center of gravity to create the moment-arms described above for changing the position of a vehicle. In some embodiments, the first mass 212 may be movable across a first length 214, as shown in the figure. The first length 214 may be a bar, track, rod, or other length that allows the mass to move from a first position to the second position. For example, and not limitation, the first mass 212 may include a linear motor that moves the first mass 212 from a first position to a second position along a rod, bar, or similar length. A linear motor could include a BLDC linear motor, a solenoid actuator, and the like.

In some embodiments, a vehicle control system 200 may include a second mass 216. The second mass 216 may be similar to the first mass 212. In some embodiments, the second mass 216 may be moveable across a length, e.g., second length 218, similar to the first mass 212. The second mass 216 may include similar electric motors as described above for the first mass 212. It is contemplated that the first length 214 and the second length 218 are not parallel to each other. For example, the movement of the first mass 212 and the movement of the second mass 216 can be used to move the center of gravity of the vehicle control system 200 in three dimensions instead of along a length 214, 218. This three-dimensional change to the center of gravity can provide a more precise moment of the vehicle control system 200. It is contemplated that the first length 214 and the second length 218 can be perpendicular to each other, as shown in the figure; however, the first length 214 and the second length 218 are not required to be substantially perpendicular.

In some embodiments, to create three-dimensional center-of-gravity change, the vehicle control system 200 may include not two moveable masses but a single mass movable in three dimensions. For example, it is contemplated that the first mass 212 may be positioned on a rotatable first length 214. As the first mass 212 moves from a first position to a second position along the first length 214, two-dimensional movement can be provided to the vehicle control system 200; as the first length 214 is rotated, the movement of the first mass 214 can now provide three-dimensional movement for the vehicle control system 200.

It is also contemplated that the first mass 212 and/or the second mass 216 could be a liquid, and the liquid masses 212, 216 could be moved from a first position to a second position by moving the fluid from one location in the vehicle to another location. In some embodiments, the liquid could be a fuel for the one or more power sources 208, 210 described herein, and the first position and the second position could be a first fuel tank and a second fuel tank, for example.

In some embodiments, a vehicle control system 200 may include an energy source 220. The energy source can include a battery, such as a lithium polymer, nickel cadmium, nickel metal hydride batteries, and/or the like.

In some embodiments, the vehicle control system 200 may include one or more controller 222. The controller 222 may provide on-board computation for controlling the thrust (i.e., the rotary moment described above) and/or the position changes (i.e., the movement of the moveable masses described above). The controller 222 may include a flight control system, vehicle state estimation, and/or middleware for communicating with other systems. The controller 222 can include an inertial measurement unit (IMU) that may include additional components for measuring the flight of a vehicle. The IMU may include movement-detecting components including accelerometers, gyroscopes, magnetometers, barometers, and similar components. The IMU may also provide redundancy in the form of multiple components, including for example one or more accelerometers, one or more gyroscopes, one or more magnetometers, one or more barometers, and the like. Additional controller 222 features and controller design are described in greater detail herein.

In some embodiments, the vehicle control system 200 may include a movement-system frame 224. The movement-system frame 224 may be provided as support for the components of the vehicle control system 200. For example, the propulsion components (e.g., the first plurality of propellers 202, second plurality of propellers 204, power sources 208, 210, and similar features) may be connected the movement-system frame 224. Other components for altering the moment-arms (e.g., first mass 212, second mass 216, and similar features) of the vehicle control system 200 may be connected to the movement-system frame 224. Additional components may be connected to the movement-system frame 224, including but not limited to the energy source and/or controller 222.

In some embodiments, the controller 222 may include a transceiver for receiving wireless signals to control the components described herein. For example, the transceiver may receive wireless signals with instructions to move a first mass 212 from a first position to a second position along a first length 214; similar signals could include these instructions for a second mass 216. The wireless signal can also include instructions to alter the angular velocity and/or angular acceleration of a first plurality of propellers 202 and/or a second plurality of propellers. This signal can, therefore, increase the thrust of the vehicle and/or change the yaw of the vehicle. In some embodiments, the transceiver may be a component separate from the controller 222.

It is also contemplated that other components may be provided in a vehicle, and these other components may be connected to the movement-system frame 224. In some embodiments, the vehicle may include a video camera, which is a common component in UAVs, including consumer drones. As described above, the present systems are not limited to UAVs, and can be scaled to be used in manned aircrafts. Accordingly, it is contemplated that the vehicle may include a chassis and/or cabin for humans and cargo. This chassis and/or cabin can be connected to the movement system-frame 224.

FIG. 3 is a perspective view of an exemplary vehicle control system 200 with a hingeably connected base frame 302, according to some embodiments of the present disclosure. As described above, the components of a system may include a movement system-frame 224 to connect and house the various components of the vehicle control system 200. In some embodiments, the movement system-frame 224 may be hingeably connected to a base frame 302. The two frames may be connected by a hinge 304. The hinge 304 can be a universal joint, such as a hook-type joint, a cross-type joint, and the like. This hinged connected between a movement system-frame 224 and a base frame 302 may be provided when the vehicle is to move cargo or persons within a cabin. For example, with a hinged construct, the movement system-frame 224 may move independently from the base frame 302 such that the base frame 302 stays relatively horizontal to the ground when the center of gravity of the movement system-frame 224 is being altered.

FIG. 3 also depicts an exemplary coaxial power source comprising a first power source 208 and a second power source 210 in mechanical communication with a first rotary shaft 306 and a second rotary shaft 308, respectively. As will be appreciated, in some embodiments, two rotary shafts 306, 308 can be placed coaxial with each other by having, for example, a first rotary shaft 306 placed inside and coaxial with the second rotary shaft 308.

Figure 4:
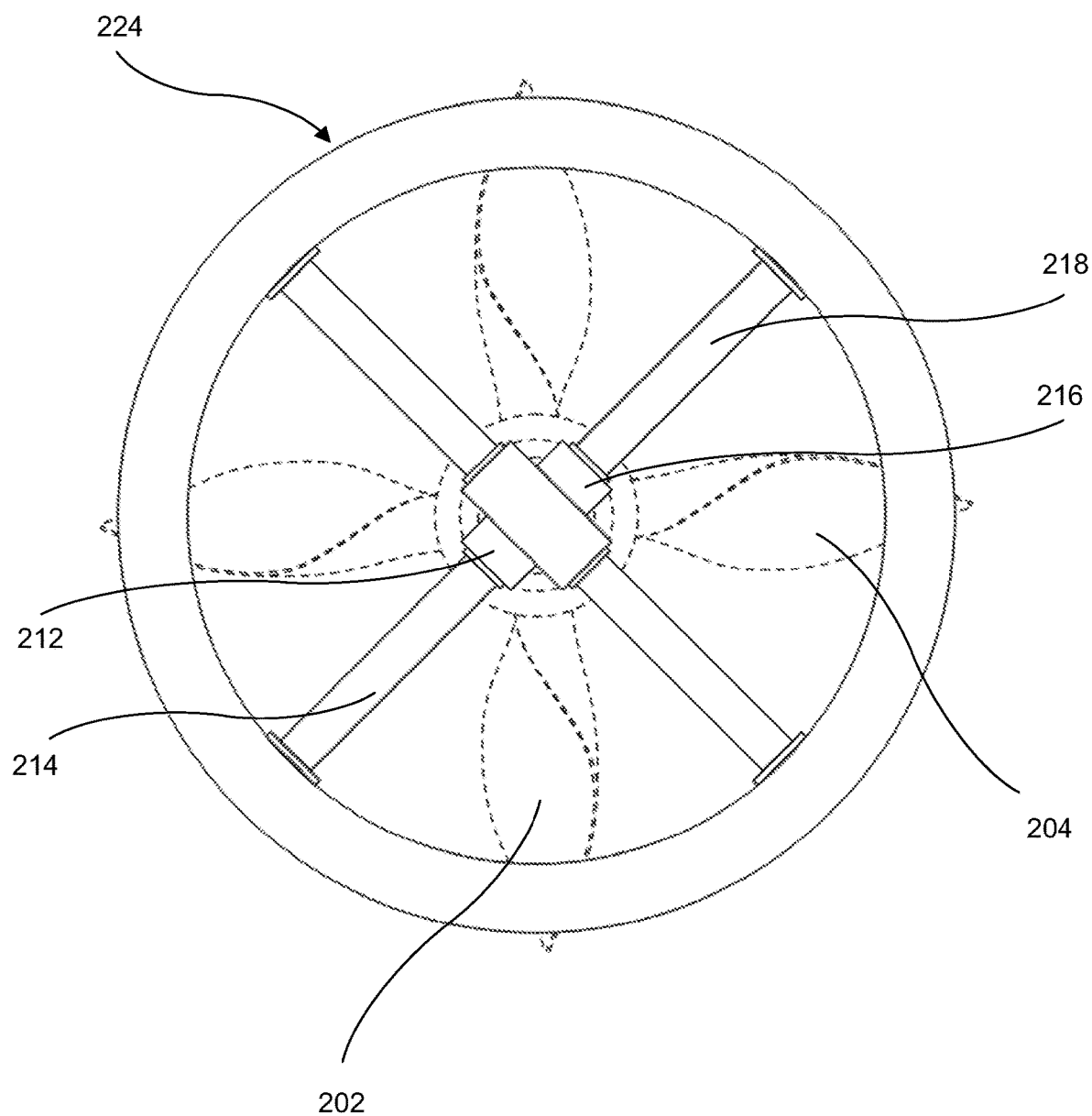
FIG. 4 is an orthogonal view of an exemplary vehicle control system as seen from a bottom of the vehicle control system, according to some embodiments of the present disclosure.

FIG. 4 is an orthogonal view of an exemplary vehicle control system 200 as seen from a bottom of the vehicle control system 200, according to some embodiments of the present disclosure. This figure provides detail of an exemplary embodiment having a first mass 212 moveable along a first length 214 (e.g., a bar in this embodiment), and a second mass 216 moveable along a second length 218 (e.g., a bar in this embodiment).

As described herein, the movements of the first mass 212 and/or the second mass 216 can alter the position of the center of gravity of the vehicle control system 200. This change in the center of gravity will thereby create a larger moment arm at certain points of the vehicle control system. These changes in the moment arm can create at least one of a rolling moment or a pitching moment. It is contemplated that more than two masses 212, 216 may be provided in a vehicle control system 200.

FIG. 5 is a perspective view of an exemplary vehicle control system 200, according to some embodiments of the present disclosure. FIG. 5 depicts a single-axle system, which is in accordance with some embodiments. For example, as described in FIG. 2, some embodiments may include more than one power source 208, 210 and more than one rotary shaft. In other embodiments, and as shown in FIG. 5, a vehicle control system 200 may include only one of the components, e.g., a first power source 208, a first rotary shaft 306, and a first plurality of propellers 202 connected to the first rotary shaft 306. In these embodiments, yaw control may be provided by means other than providing a coaxial rotary shaft with propellers. For example, these embodiments may include a tail rotor to help control yaw. In other embodiments, a second single-rotor system can be provided with similar components as those shown in FIG. 5. In embodiments with a second single-rotor system, the second plurality of propellers (not shown in FIG. 5) can rotate in an opposite direction as the first plurality of propellers 202. An angular velocity of the first plurality of propellers 202 can altered independent from said second plurality of controllers to adjust yaw.

Figure 6:
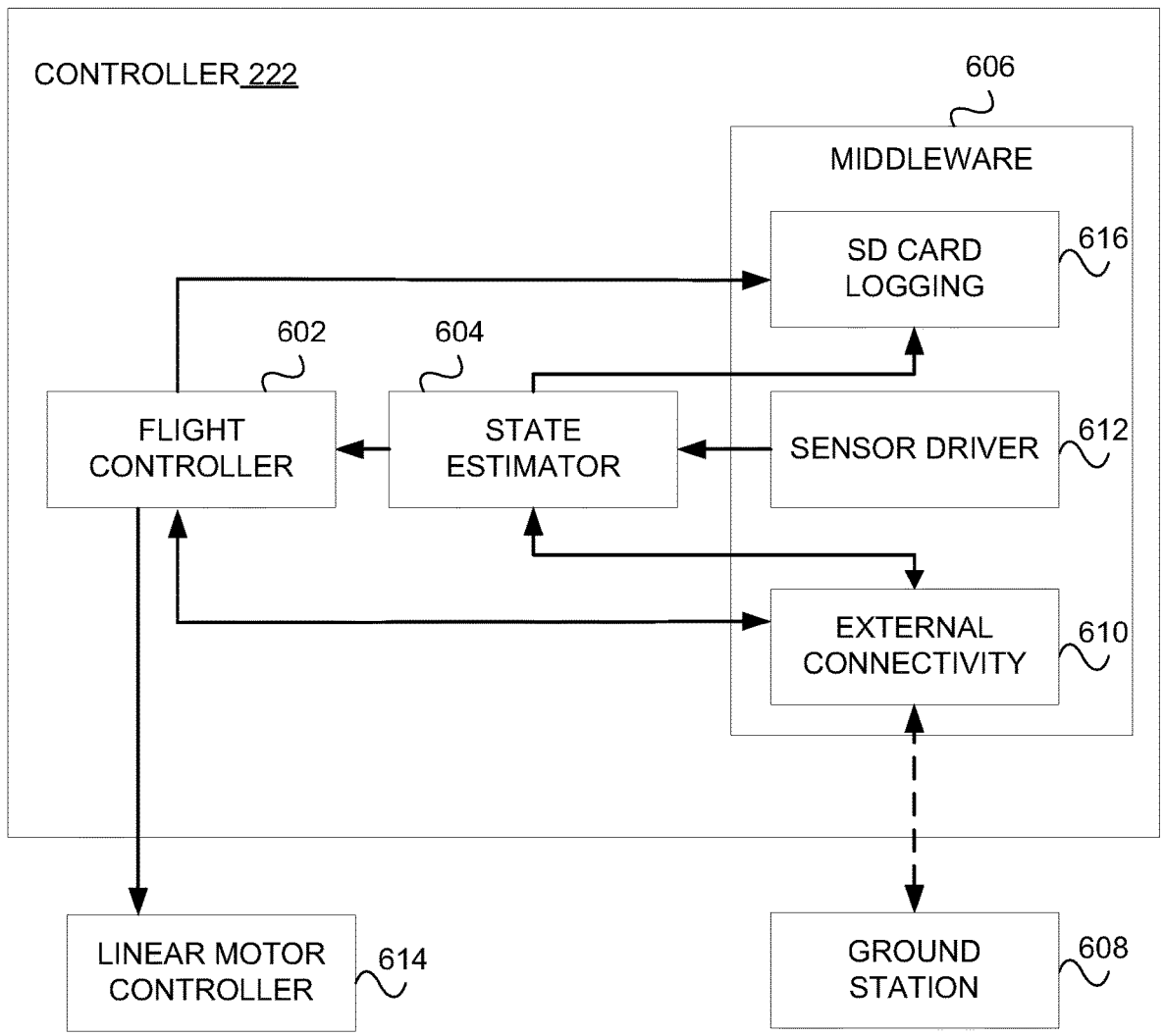
FIG. 6 is a component diagram of an exemplary component algorithm for controlling a vehicle control system, according to some embodiments of the present disclosure.

FIG. 6 is a component diagram of an exemplary component algorithm 600 for controlling a vehicle control system 200, according to some embodiments of the present disclosure. A vehicle control system 200 may include both on-board and off-board computational controls. In some embodiments, a vehicle control system 200 may be able to adjust thrust and torque to both (1) automatically maintain stability and/or position of the vehicle and (2) respond to external controls for a desired position, a desired speed, and/or a desired attitude. An on-board system may contain a flight controller 602, vehicle state estimation 604, and a middleware 606 for communicating with other systems. When off-board computation is provided, a ground station 608 may run software to provide the user visual representations of the state and to further relay the user's control commands to the vehicle via an external connectivity component 610, for example the transceiver described above.

The algorithm for controlling the vehicle may be performed by the controller 222 described above. In an exemplary embodiment a sensor driver 612 in a middleware block 606 may communicate with physical sensors of a vehicle control system to obtain raw data for the state estimator 604. The physical sensors of the vehicle may include accelerometers, gyroscopes, magnetometers, barometers, and similar components, which may be associated with the controller 222. After the state estimator 604 receives data regarding vehicle position, the behavior of the vehicle may be predicted by, for example, a flight controller 602. At this point, the flight controller 602 may adjust either the thrust of the system or the position of the system. For example, the position of the system may be altered by adjusting the position of the one or more masses described above. This adjustment may be performed by a linear motor controller 614. The linear motor controller 614 can then provide a signal for the one or more masses to move from a first position to a second position.

The prior processes describe the controller stabilizing the vehicle. The controller 222 may also receive control signals from the ground station 608 to adjust the thrust and/or position of the vehicle based on desired parameters. The control signals may include at least one of a desired position, a desired speed, or a desired attitude for the vehicle. The desired position and/or speed of the vehicle may be achieved by altering the torque of the vehicle control system 200. The desired torque may be achieved by adjusting the one or more masses described above. This adjustment may be performed by a linear motor controller 614. The linear motor controller 614 can then provide a signal for the one or more masses to move from a first position to a second position. The estimated state of the vehicle determined by the state estimator 604 and the control signal calculated by the flight controller 602 may be logged in memory storage 616 (e.g., a secure digital card) for recording in-flight data and post analysis.

Figure 7:
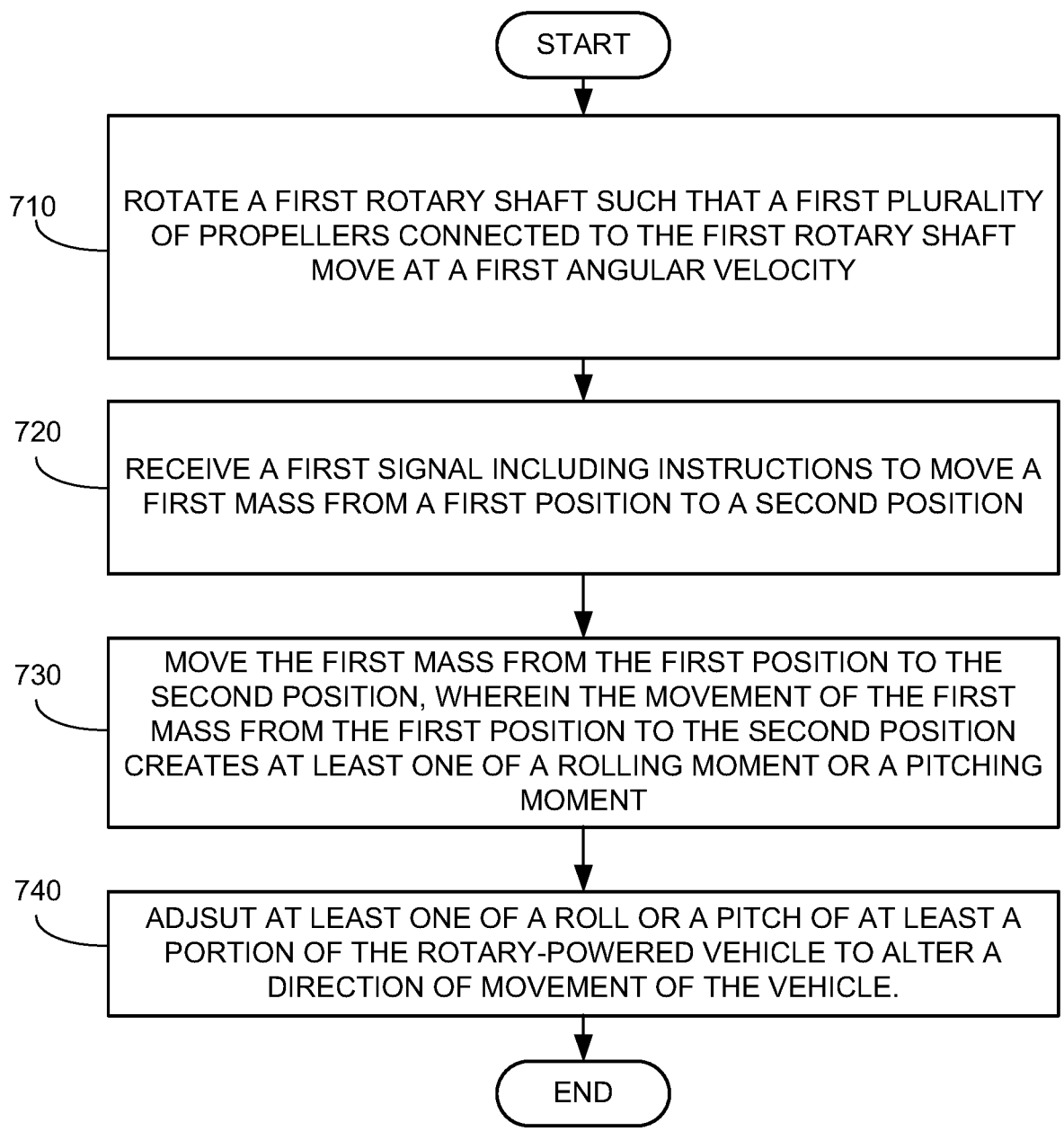
FIG. 7 is an example flow chart showing a process in which a vehicle control system may alter the position of a vehicle, according to some embodiments of the present disclosure.

FIG. 7 is an example flow chart showing a process 700 in which a vehicle control system 200 may alter the position of a vehicle by creating either a rolling or pitching moment, according to some embodiments of the present disclosure. The process 700 may begin at block 710, where the vehicle control system rotates a first rotary shaft such that a first plurality of propellers connected to the first rotary shaft move at a first angular velocity. This rotation may be provided by the power sources described herein. This step may also include a first power source connected to more than one rotary shafts, for example in the case of a coaxial embodiment, as described herein, or in the case of multiple power components not placed coaxially (e.g., a quadcopter design).

At block 720, the vehicle control system can receive a first signal, wherein the first signal includes instructions to move a first mass from a first position to a second position. This can signal can be received, for example, by the transceivers described herein. As described herein, more than one mass may be provided. For example, in some embodiments, a single mass may provide three-dimensional center-of-gravity-shifting control; in other embodiments, a first mass and a second mass may provide three-dimensional center-of-gravity-shifting control.

At block 730, the vehicle control system can move the first mass from the first position to the second position, wherein the movement of the first mass from the first position to the second position creates at least one of a rolling moment or a pitching moment. Again, this rolling or pitching moment may be produced by a first mass moving or by two masses working concurrently to shift the center of gravity.

At block 740, the vehicle control system can adjust at least one of the pitch or roll of at least a portion of the rotary-powered vehicle to alter a direction of movement of the vehicle. In some embodiments, the entire vehicle can be pitched or rolled due to the shifting of the moment arm. In other embodiments, only a portion of the vehicle may be pitched or rolled. For example, in an embodiment with a hingeably attached base frame 302 (as shown in FIG. 3), the movement-system frame 224 may pitch or roll independently from the base frame 302.

Process 700 may end after block 740. In some embodiments, the process 700 may further include rotating, via a second power source, a second rotary shaft such that a second plurality of propellers connected to the second rotary shaft move at a second angular velocity. In some embodiments, the process 700 may further include rotating, via the first power source, a second rotary shaft such that a second plurality of propellers connected to the second rotary shaft move at a second angular velocity. In some embodiments, the process 700 may further include receiving, via the transceiver, a second signal, wherein the second signal includes instructions to adjust at least one of the first angular velocity or the second angular velocity. These and other methods of operating a vehicle control system 200 are contemplated.

Non-Linear Controller for Coaxial Vehicles

Figure 8:
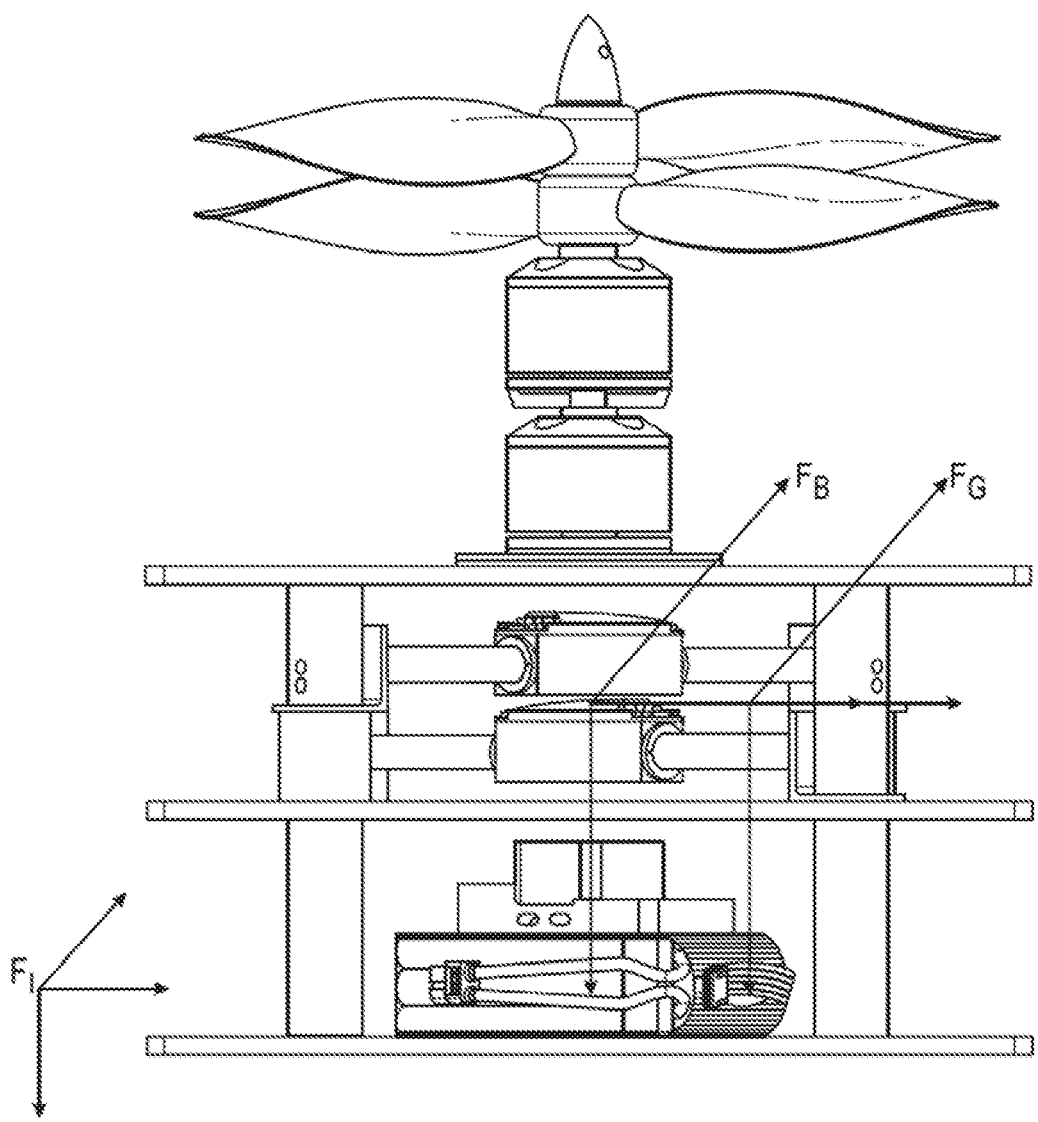
FIG. 8 depicts an exemplary vehicle control system with coordinate frames, according to some embodiments of the present disclosure.

The non-linear dynamic model of a mass-moving coaxial vehicle, for example the embodiment shown in FIG. 1, can be derived from the Newton-Euler equations in order to describe the translational and rotational dynamics of the vehicle. To investigate the dynamics, three coordinate frames of reference can be defined. FIG. 8 depicts an exemplary vehicle control system 200 with coordinate frames. The first coordinate frame is the fixed-inertial frame denoted $\mathcal{F}_I$. Moreover, any arbitrary vector, $\vec{x}$, and its time derivative $\vec{\dot{x}}$, represented in this inertial are denoted by $^I\vec{x}$ and $^I\vec{\dot{x}}$ respectively. The second frame of reference is the vehicle body-fixed frame ($\mathcal{F}_B$) where its origin is fixed at the geometric center of the vehicle (point O) and its xyz-coordinate axes rotate along with the vehicle. Similar to $\mathcal{F}_I$, a vector and its derivative represented in $\mathcal{F}_B$ are denoted by $^b\vec{x}$ and $^b\vec{\dot{x}}$, respectively. The last frame of reference is the CoG-fixed frame ($\mathcal{F}_G$) where its orientation is aligned with $\mathcal{F}_B$; however, this frame moves as the vehicle's COG (point G) moves. The position and orientation of the coaxial helicopter are represented as relative measures to $\mathcal{F}_I$. However, both linear and angular velocities are represented in $\mathcal{F}_B$. Furthermore, the position of the CoG is described as a relative distance of $\mathcal{F}_G$ with respect to $\mathcal{F}_B$. The parameters that may be used for these measures can be described as:

$^I\vec{p} \in \mathbb{R}^3$: The position of O relative to $\mathcal{F}_I$ in $\mathcal{F}_I$.
$^b\vec{v} \in \mathbb{R}^3$: The linear velocity of O relative to $\mathcal{F}_I$ in $\mathcal{F}_B$.
$R \in SO(3)$: The rotational matrix from $\mathcal{F}_B$ to $\mathcal{F}_I$.
$^b\vec{\omega} \in \mathbb{R}^3$: The angular velocity of $\mathcal{F}_B$ relative to $\mathcal{F}_I$ in $\mathcal{F}_B$.
$^b\vec{r} \in \mathbb{R}^3$: The position of G; relative to O in $\mathcal{F}_B$.
$^b\vec{r}_{m_i} \in \mathbb{R}^3$: The position of the $i^{th}$ moving mass relative to $\mathcal{F}_B$ in $\mathcal{F}_B$.
$^b\vec{\Omega}_i \in \mathbb{R}^3$: The rotational speed of the $i^{th}$ rotor in $\mathcal{F}_B$.
$^b\vec{F} \in \mathbb{R}^3$: The total force acting on the vehicle in $\mathcal{F}_B$.
$^b\vec{M} \in \mathbb{R}^3$: The total moment acting on the vehicle in $\mathcal{F}_B$.
$M \in \mathbb{R}$: The total mass of the vehicle.
$m_i \in \mathbb{R}$: The mass of the $i^{th}$ moving mass.
$J \in \mathbb{R}^{3 \times 3}$: The total moment of inertia of the vehicle
$g \in \mathbb{R}$: The gravitational acceleration.

Hence, the configuration manifold for a coaxial helicopter can be represented in the special Euclidean group:

$$g = \begin{bmatrix} R & ^I\vec{p} \\ 0 & 1 \end{bmatrix} \in SE(3) \qquad \text{Equation 2}$$

In some embodiments described herein, the translational and rotational dynamics of coaxial vehicles, e.g., the embodiment shown in FIG. 8, may be affected both by the movement of the vehicle and the movement of the moveable masses changing the center of gravity of the vehicle. Accordingly, in some embodiments, a nonlinear control technique may account for each of the reference position of the vehicle, the dynamics of the moveable masses, and the dynamics of the vehicle achieving the desired attitude, speed, and/or position.

In some embodiments, a nonlinear feedback controller may have a coaxial vehicle control system follow an arbitrary twice-differential reference trajectory denoted by $g_{ref(t)} \in SE(3)$ consisting of the reference position $\vec{p}_{ref}(t) \in \mathbb{R}^3$, and the reference attitude $R_{ref}(t) \in SO(3)$. In some embodiments, a nonlinear controller can be separated into three parts: (1) a position controller designed for the vehicle to track the reference position, (2) an attitude controller designed for the vehicle to track the reference attitude, and (3) an actuator controller designed for the actuators to provide the desired amount of forces (thrust) and moments.

As for the reference trajectory generation for the controller, the smooth function for the reference position, $P_{ref}(t)$, parameterized by time, t, can be generated from the least squares optimization problem given a set of waypoints, $\{(P_{ref_i}, t_i)\}_{i=0}^N$ where $P_{ref_i} = P_{ref}(t_i) \in \mathbb{R}^3$ and $t_i \in \mathbb{R}$, $$\min_{\vec{\alpha}} \sum_{i=1}^{N} (p_{re} | f_i - \phi(\vec{\alpha}, t_i))^2 \qquad \text{Equation 3}$$

where $\phi(\vec{\alpha}, t_i)$ is a fitting model with the parameter vector $\vec{\alpha}$. The choice of this fitting model has to satisfy the twice-differentiable requirement, which can be, for example, polynomial or trigonometric function. Then $\overline{P}_{ref}(t)$ and can be represented by $\phi(\bar{\alpha}, t_i)$. And, consequently, the reference velocity and acceleration can be expressed by $\dot{\bar{P}}_{ref}(t)$ and $\ddot{\bar{P}}_{ref}(t)$, respectively.

For the reference attitude $R_{ref}(t)$, its first column vector, $R_{ref}\vec{e}_1$, can be considered as the heading of the vehicle. This vector can be chosen arbitrarily; however, it may be desirable to align the vehicle's heading with the tangential line to the reference position trajectory. Therefore, the heading vector, $R_{ref}\vec{e}_1$, can be chosen to have the same direction as the unit vector of the reference velocity vector:

$$\frac{\dot{\vec{p}}_{ref}(t)}{\left\|\dot{\vec{p}}_{ref}(t)\right\|}.$$

For the other two column vectors of the reference attitude, $R_{ref}\vec{e}_2$ and $R_{ref}\vec{e}_3$, they may satisfy the orthogonality condition of the rotation matrix, which can be obtained by the following cross products:

$$R_{ref}\vec{e}_2 = \frac{\vec{e}_3 \times R_{ref}\vec{e}_1}{\left\|\vec{e}_3 \times R_{ref}\vec{e}_1\right\|} \qquad \text{Equation 4}$$

$$R_{ref}\vec{e}_3 = \frac{R_{ref}\vec{e}_1 \times R_{ref}\vec{e}_2}{\left\|R_{ref}\vec{e}_1 \times R_{ref}\vec{e}_2\right\|} \qquad \text{Equation 5}$$

Once the reference attitude is determined, the reference angular velocity, $\vec{\omega}_{ref}(t)$, and the reference angular acceleration, $\dot{\vec{\omega}}_{ref}(t)$, can be obtained by:

$$\vec{\omega}_{ref}(t) = R_{ref}^T(t)\dot{R}_{ref}(t) \qquad \text{Equation 6}$$

$$\dot{\vec{\omega}}_{ref}(t) = \dot{R}_{ref}^T(t)\dot{R}_{ref}(t) + R_{ref}^T(t)\ddot{R}_{ref}(t) \qquad \text{Equation 7}$$

As for the position controller, since $\vec{P}_{ref}(t)$ is generated as a function expressed in $\mathcal{F}_\mathcal{I}$, it may be beneficial to also express the translational dynamics in $\mathcal{F}_\mathcal{I}$ as follows:

$$^I\dot{\vec{p}} = ^I\vec{v} \qquad \text{Equation 8}$$

$$^I\dot{\vec{v}} = -\frac{R}{M}\left(^b\vec{F} + M^b\ddot{\vec{r}}\right) + g\vec{e}_3 \qquad \text{Equation 9}$$

Noting that $^b\vec{F}$ has only the third component of $\mathcal{F}_B$, and $^b\vec{r}$ has only the first and the second components of $\mathcal{F}_B$, $^b\vec{F} + M^b\ddot{\vec{r}}$ can be considered as a desired input to this translational block.

Next, the tracking error vectors for the position and the velocity can be defined, respectively, as:

$$\vec{e}_p = \vec{p} - \vec{p}_{ref} \qquad \text{Equation 10}$$

$$\vec{e}_v = \vec{v} - \dot{\vec{p}}_{ref} \qquad \text{Equation 11}$$

Then, the stabilizing control force, $\vec{F}'_d$, is given by:

$$\vec{F}'_d = M\left[g\vec{e}_3 - \ddot{\vec{p}}_{ref} + \left(\frac{k_p}{k_v} + k_pk_v\right)\vec{e}_p + (k_p + k_v)\vec{e}_v\right] \qquad \text{Equation 12}$$

Where $k_p, k_v \in \mathbb{R}^+$ are constant positive definite matrices. However, in some embodiments, the current attitude of the vehicle may not immediately align with the desired one, and this may cause the system to become unstable. Accordingly, in some embodiments, the magnitude of the total thrust can be designed to be small if the attitude error is large so that the rotational dynamics can converge faster than the translational one. In these embodiments, by assuming $\|\vec{F}'_d\|$ is non-zero, $\|^b\vec{F}\|$ can be given as:

$$\|^b\vec{F}\| = \|\vec{F}'_d\|\left(\frac{\vec{F}'_d}{\|\vec{F}'_d\|}\right)^T(R\vec{e}_3) \qquad \text{Equation 13}$$

Since $$\frac{\vec{F}'_d}{\|\vec{F}'_d\|}$$

can be considered as the desired attitude vector, $$\left(\frac{\vec{F}'_d}{\|\vec{F}'_d\|}\right)^T(R\vec{e}_3)$$

is the dot product between the desired attitude vector and the current one. This dot product reduces the magnitude of the total thrust as the angle between these two attitude vectors becomes larger.

To achieve the reference position tracking, the position controller requires the vehicle's attitude to eb compatible with the translation input $\vec{F}'_d = R^b\vec{F}'$. This can be done by aligning the resulting vector of $^b\vec{F} - M^b\ddot{\vec{r}}$. However, it can be assumed that the forces from the transient acceleration of the moving masses, $M^b\ddot{\vec{r}}$ are relatively small compared to the thrust from a coaxial motor, $^b\vec{F}$. Hence, the desired attitude can be chosen to align $^b\vec{F}$ with $\vec{F}'_d$.

To achieve this desired attitude, the third column of the reference attitude, $R_{ref}\vec{e}_3$, can coincide with the direction of the unit vector $$\frac{\vec{F}'_d}{\|\vec{F}'_d\|}.$$

Nevertheless, this is not always the case since $R_{ref}(t)$ may have been chosen arbitrarily, as described herein. Accordingly, the following optimization problem may be solved for the correct attitude, $R'_{ref}(t)$.

$$R'_{ref}(t) = \underset{R \in SO(3)}{\mathrm{argmin}} \Theta(R_{ref}, R) \qquad \text{Equation 14}$$

$$\text{s.t. } R\vec{e}_3 = \frac{\vec{F}'_d}{\|\vec{F}'_d\|}$$

where $\Theta(\cdot, \cdot): SO(3) \times SO(3) \rightarrow \mathbb{R}$ is the tracking error for the function given by:

$$\Theta(R_{ref}, R) = \tfrac{1}{2}\mathrm{Trace}(I_3 - R_{ref}^T R) \qquad \text{Equation 15}$$

The solution to this optimization problem is given by:

$$R'_{ref}(t) = \begin{cases} \mathcal{R}(\vec{r}, \theta)R_{ref}, & \text{if } R_{ref}\vec{e}_3 \cdot \vec{F}'_d > 0 \\ \mathcal{R}(-\vec{r}, \pi - \theta)R_{ref}, & \text{otherwise} \end{cases} \quad \text{Equation 16}$$

where $$\vec{r} = \frac{R_{ref}\vec{e}_3 \times \vec{F}'_d}{\|R_{ref}\vec{e}_3 \times \vec{F}'_d\|},$$

$$\theta = \arccos\left(R_{ref}\vec{e}_3 \cdot \frac{\vec{F}'_d}{\|\vec{F}'_d\|}\right), \text{ and}$$

$$\mathcal{R}(\vec{r}, \theta): \mathbb{R}^3 \times \mathbb{R} \to SO(3)$$

is Rodrigues' formula given by:

$$\mathcal{R}(\vec{r}, \theta) = I_3 + \sin(\theta)\frac{\vec{r}}{\|\vec{r}\|_2} + (1 - \cos(\theta))\frac{\vec{r}^2}{\|\vec{r}\|_2^2} \quad \text{Equation 17}$$

Then, the derivative of $R'_{ref}(t)$ is given by:

$$\dot{R}'_{ref}(t) = R'_{ref}(t)\overline{w}'_{ref}(t) \quad \text{Equation 18}$$

where $\overline{w}'_{ref}(t)$ can be obtained from rotating $\overline{w}'_{ref}(t)$ to $R'_{ref}(t)$ coordinate, or:

$$\overline{w}'_{ref}(t) = R'^T_{ref}(t)R_{ref}(t)\overline{w}_{ref}(t) \quad \text{Equation 19}$$

and, $$\dot{\overline{w}}'\text{ref}(t) = -\overline{w}_{ref}(t)R'^T_{ref}(t)R_{ref}^T R_{ref}(t)$$
$$\overline{w}_{ref}(t) + R'^T_{ref}(t)R_{ref}(t)\overline{w}_{ref}(t)\overline{w}_{ref}(t) + R'^T_{ref}(t)R_{ref}(t)$$
$$\dot{\overline{w}}_{ref}(t) \quad \text{Equation 20}$$

Next, by defining the tracking error vectors for the attitude and the angular velocity $$\vec{e}_R = \tfrac{1}{2}(R'^T_{ref}R - R^T R'_{ref})^v \quad \text{Equation 21}$$

$$\vec{e}_\omega = {}^b\vec{\omega} - R^T R'_{ref}\vec{\omega}'_{ref} \quad \text{Equation 22}$$

where the operator $(\bullet)^v: so(3) \to \mathbb{R}^3$ denotes the inverse of the operator $(\hat{\bullet})$, and by supposing that the initial condition of the attitude lying in the sublevel set $L_2 = \{R'\text{ref}, R \in SO(3) | \Theta(R'_{ref}, R) < 2\}$ satisfies $$\Theta(R'_{ref}(0), R(0)) < 2\|\vec{e}_\omega(0)\|^2 < 2k_R(2 - \Theta(R'_{ref}(0), R(0))) \quad \text{Equation 23}$$

implying the initial attitude error must be less than 180° with respect to the rotational axis between $R'_{ref}(0)$ and $R(0)$. Then, the stabilizing control moment, ${}^b\vec{M}$, is given by:

$$^b\vec{M} = {}^b\vec{\omega} \times \vec{H}_G - M({}^b\dot{\vec{r}} \times {}^I\vec{r} + {}^b\vec{r} \times {}^I\ddot{\vec{r}}) +$$
$$\sum_{i=1}^{2} m_i({}^b\dot{\vec{r}}_{m_i} \times {}^I\vec{r}_{m_i} + {}^b\vec{r}_{m_i} \times {}^I\ddot{\vec{r}}_{m_i}) +$$
$$\hat{J}\left[R^T R'_{ref}\dot{\vec{\omega}}'_{ref} - {}^b\hat{\omega}R^T R'_{ref}\vec{\omega}'_{ref} +\right.$$
$$\left. R^T R'_{ref}\hat{\omega}'_{ref}\vec{\omega}'_{ref} - k_R\vec{e}_R - \left(k_\omega + \frac{k_R}{k_\omega}\Psi(R_{ref}, R)\right)\vec{e}_\omega\right] \quad \text{Equation 24}$$

where $k_R, k_\omega \in \mathbb{R}^+$ are constant, and $\Psi(R'_{ref}, R) = \tfrac{1}{2}[\text{Trace}(R^T R'_{ref})I_3 - R^T R'_{ref}]$.

As for the actuator controller, the controller can be considered to be broken into both a coaxial motor controller and a linear motor controller (i.e., thrust and mass-movement). As for the coaxial motor controller, the controller input for each rotor, $u_{\Omega_i}$, i=1, 2, can be determined by solving a system of two quadratic equations:

$$\|\vec{F}'d\| = k_{F_1}u_{\Omega_1}^2 + k_{F_2}u_{\Omega_2}^2 \quad \text{Equation 25}$$

$$^b\vec{M} \cdot \vec{e}_3 = k_{M_1}u_{\Omega_1}^2 + k_{M_2}u_{\Omega_2}^2 \quad \text{Equation 26}$$

As for the linear controller, since ${}^b\vec{r}$ and ${}^b\vec{F}$ are orthogonal to each other, the reference position, $\vec{r}_{ref_i}$, i=1, 2, for each linear motor can be uniquely determined by the following equations:

$$\vec{r}_{ref_1} = \left(-\frac{M}{m_1} \cdot \frac{{}^b\vec{M} \cdot \vec{e}_2}{\|{}^b\vec{F}\|}\right)\vec{e}_1 \quad \text{Equation 27}$$

$$\vec{r}_{ref_2} = \left(\frac{M}{m_2} \cdot \frac{{}^b\vec{M} \cdot \vec{e}_1}{\|{}^b\vec{F}\|}\right)\vec{e}_2 \quad \text{Equation 28}$$

Next, the tracking error vectors for the position and the velocity of each moving mass can be defied, respectively as:

$$\vec{e}_{r_{m_i}} = {}^b\vec{r}_{m_i} - \vec{r}_{ref_i} \quad \text{Equation 29}$$

$$\vec{e}_{\dot{r}_{m_i}} = {}^b\dot{\vec{r}}_{m_i} - \dot{\vec{r}}_{ref_i} \quad \text{Equation 30}$$

Then, the controller input for each linear motor, $$u_{r_{m_i}}, i = 1, 2,$$

can be given by:

$$u_{r_{m_i}} = \frac{1}{k_{u_{r_{m_i}}}}$$
$$\left[\ddot{\vec{r}}_{ref_i} - k_{r_{m_i}}{}^b\dot{\vec{r}}_{m_i} - (k'_{r_{m_i}} + k''_{r_{m_i}})\vec{e}_{\dot{r}_{m_i}} - \left(\frac{k'_{r_{m_i}}}{k''_{r_{m_i}}} + k'_{r_{m_i}}k''_{r_{m_i}}\right)\vec{e}_{r_{m_i}}\right] \quad \text{Equation 31}$$

where $$k'_{r_{m_i}}, k''_{r_{m_i}} \in \mathbb{R}^+$$

are constant.

Figure 9:
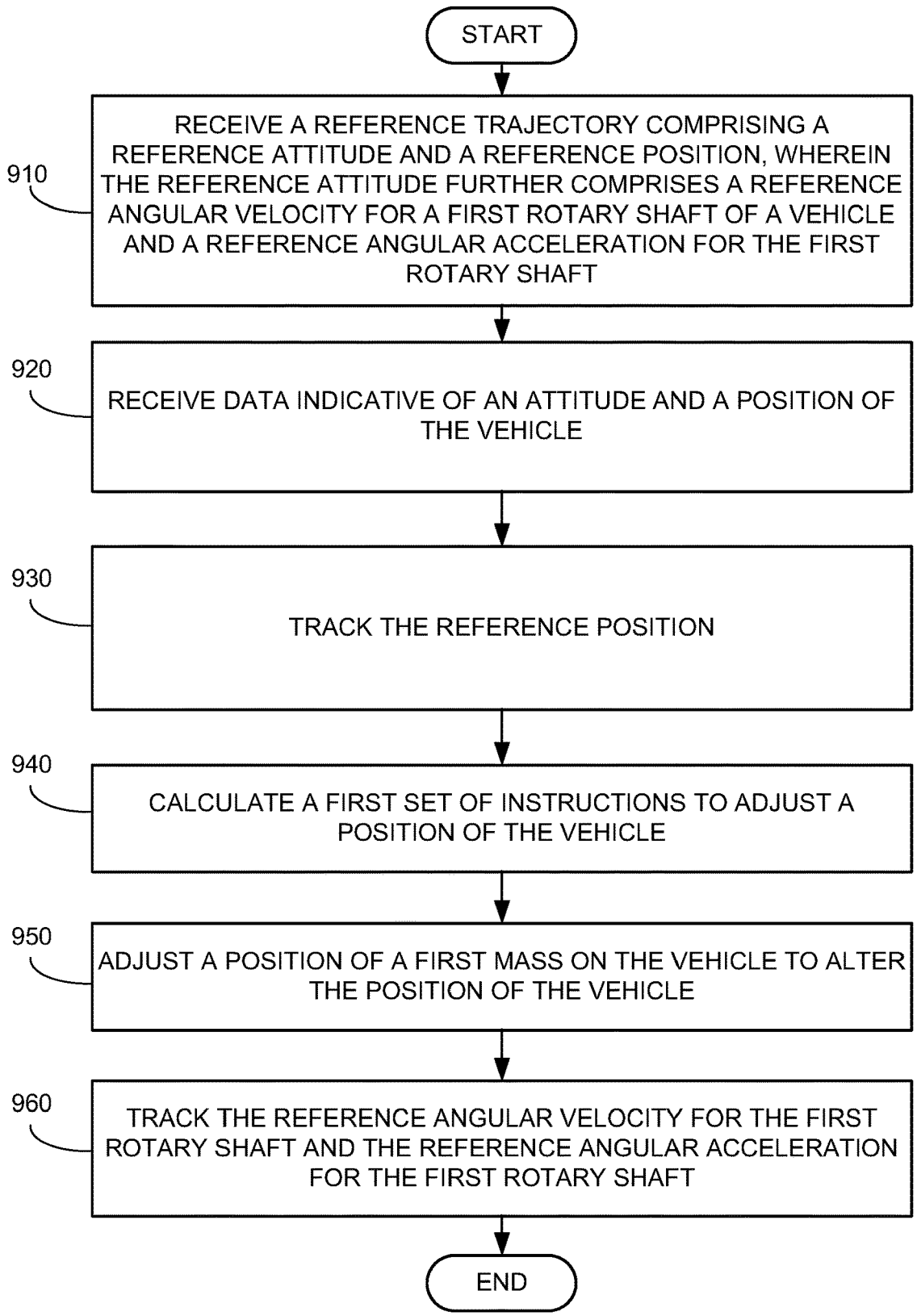
FIGS. 9-10 are example flow charts showing exemplary processes for producing non-linear controls.

FIG. 9 is an example flow chart showing an exemplary process 900 for producing the non-linear controls described above. In particular, process 900 relates to an exemplary process for calculating and configuring resultant forces and moments to stabilize a vehicle control system via controllers. The process 900 can be performed in whole or in part by any of the controllers described herein, including but not limited to the controller 222 or any sub-controller associated therewith.

The process 900 may begin at block 910, where a vehicle control system receives a reference trajectory comprising a reference attitude and a reference position. The reference attitude can further comprise a reference angular velocity for a first rotary shaft of a vehicle and a reference angular acceleration for the first rotary shaft. The reference trajectory may be received, for example, at a flight controller (e.g., flight controller 602).

At block 920, a vehicle control system can receive data indicative of an attitude and a position of the vehicle. This can be received, for example, by a state-estimator controller (e.g., state estimator 604).

At block 930, a vehicle control system can track the reference position. This tracking can be performed, for example, by a position controller interacting with one or more linear motor controllers (e.g., linear motor controller 614).

At block 940, a vehicle control system can calculate a first set of instructions to adjust a position of the vehicle. The calculation can be based at least in part on the reference position.

At block 950, a vehicle control system can adjust a position of a first mass on the vehicle to alter the position of the vehicle. This step can be performed, for example, by using the moveable masses described herein. This adjustment can be based at least in part on the first set of instructions.

At block 960, a vehicle control system can track the reference angular velocity for the first rotary shaft and the reference angular acceleration for the first rotary shaft. This can be performed, for example, via the controller 222 or a sub-controller associated therewith, such as an attitude controller. The process 900 may end at block 960. As will be described below, however, additional movement calculations may be processed before, after, or concurrently with process 900. Additionally, each step in process 900 described in the context of a single rotor can also be applied to a second rotor in a coaxial system. Also, each step in process 900 described in the context of a single moveable mass can also be applied to a second moveable mass.

Figure 10:
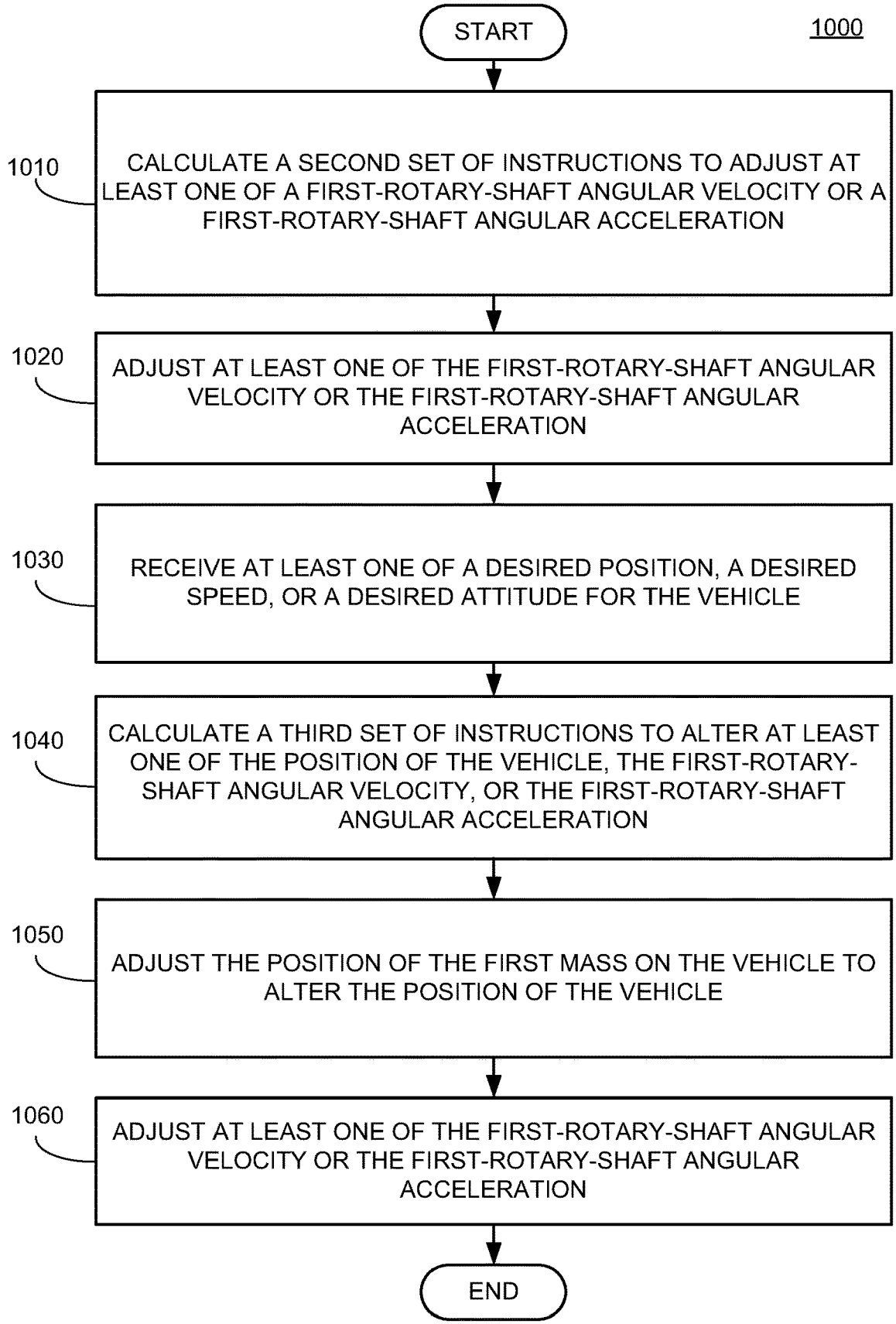

FIG. 10 is an example flow chart showing an exemplary process 1000 for producing the non-linear controls described above. In particular, process 1000 relates to an exemplary process for calculating and configuring resultant forces and moments to achieve a desired position, a desired speed, and/or a desired attitude. These desired movement characteristics may be supplied via an external device, such as the ground station 608 described herein. Process 1000 may be applied before, after, or concurrently with the processes described for process 900.

At block 1010, a vehicle control system can calculate a second set of instructions to adjust at least one of a first-rotary-shaft angular velocity or a first-rotary-shaft angular acceleration. The second set of instructions can be based at least in part on the reference angular velocity for the first rotary shaft or the reference angular acceleration for the first rotary shaft.

At block 1020, a vehicle control system can adjust at least one of the first-rotary-shaft angular velocity or the first-rotary-shaft angular acceleration. This adjustment can be provided via a first power source (e.g., first power source 208). The adjustment can be based at least in part on the second set of instructions.

At block 1030, a vehicle control system can receive at least one of a desired position, a desired speed, or a desired attitude for the vehicle. The desired movement characteristics can be received at the controller 222 or a sub-controller associated therewith, such as an actuator controller.

At block 1040, a vehicle control system can calculate a third set of instructions to alter at least one of the position of the vehicle, the first-rotary-shaft angular velocity, or the first-rotary-shaft angular acceleration. The third set of instructions can be based at least in part on the desired position, the desired speed, or the desired attitude. The calculations can be made by the controller 222 or a sub-controller, for example and not limitation a flight controller (e.g., flight controller 602).

At block 1050, a vehicle control system can adjust the position of the first mass on the vehicle to alter the position of the vehicle. This step can be performed, for example, by using the moveable masses described herein. This adjustment can be based at least in part on the third set of instructions.

At block 1060, a vehicle control system can adjust at least one of the first-rotary-shaft angular velocity or the first-rotary-shaft angular acceleration. The adjustment can be performed via the first power source (e.g., first power source 208). The adjustment can be based at least in part on the third set of instructions. The process 1000 may end at block 1060. Additional movement calculations may be processed before, after, or concurrently with process 1000. Additionally, each step in process 1000 described in the context of a single rotor can also be applied to a second rotor in a coaxial system. Also, each step in process 1000 described in the context of a single moveable mass can also be applied to a second moveable mass.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A vehicle control system for a vehicle having one or more rotary assemblies used for controlled flight, the vehicle control system comprising:
    a position control subsystem configured to change one or more moments of the vehicle in flight selected from the group consisting of a rolling moment, a pitching moment, a yaw moment, and a combination thereof;

wherein a change in one or more of the moments of the vehicle in flight is at least partially dependent upon a change of a center of gravity of the vehicle in flight, which change is controlled by the position control subsystem; and wherein the position control subsystem comprises:
a first mass; and
a first actuator configured to move the first mass between a first position and a second position;
wherein the center of gravity of the vehicle in flight changes upon movement of the first mass.

2. The vehicle control system of claim 1 further comprising a thrust production control subsystem configured to change one or more aerodynamic forces of the vehicle in flight selected from the group consisting of lift, drag, and a combination thereof;

wherein a change in one or more of the aerodynamic forces of the vehicle in flight is at least partially dependent upon a change in an amount of thrust produced by one or more of the rotary assemblies of the vehicle in flight, which is controlled by the thrust production control subsystem.

3. The vehicle control system of claim 2, wherein a first rotary assembly of the one or more rotary assemblies of the vehicle comprises:
a first rotary shaft connected to the vehicle;
a first set of propeller blades connected to the first rotary shaft; and
a first power source in mechanical communication with the first rotary shaft and configured to rotate the first rotary shaft; and
wherein the thrust production control subsystem is configured to control one or more of the first rotary shaft, the first set of propeller blades, and the first power source to change one or more of the aerodynamic forces of the vehicle in flight.

4. The vehicle control system of claim 3, wherein a second rotary assembly of the one or more rotary assemblies of the vehicle comprises:
a second rotary shaft connected to the vehicle; and
a second set of propeller blades connected to the second rotary shaft;
wherein the thrust production control subsystem is further configured to control one or more of the second rotary shaft and the second set of propeller blades;
wherein the first and second rotary shafts are coaxial;
wherein the first power source is in mechanical communication with the second rotary shaft;
wherein the first power source is configured to rotate the first rotary shaft in a first direction;
wherein the second rotary shaft is configured to rotate in a second direction; and
wherein the first direction is opposite the second direction.

5. The vehicle control system of claim 1, wherein a second rotary assembly of the one or more rotary assemblies of the vehicle comprises:
a second rotary shaft connected to the vehicle;
a second set of propeller blades connected to the second rotary shaft; and
a second power source in mechanical communication with the second rotary shaft and configured to rotate the second rotary shaft;
wherein the thrust production control subsystem is further configured to control one or more of the second rotary shaft, the second set of propeller blades, and the second power source;
wherein the first and second rotary shafts are coaxial;
wherein the first power source is configured to rotate the first rotary shaft in a first direction:
wherein the second power source is configured to rotate the second rotary shaft in a second direction; and
wherein the first direction is opposite the second direction.

6. The vehicle control system of claim 5, wherein the first set of propeller blades is coplanar with the second set of propeller blades.

7. The vehicle control system of claim 5, wherein the position control subsystem further comprises a second mass moveable between a third position and a fourth position; and
wherein a chance in the center of gravity of the vehicle in flight is further at least partially dependent upon a movement of the second mass.

8. The vehicle control system of claim 5 further comprising a transceiver configured to receive a wireless signal that includes instructions to adjust the angular velocity of the first set of propeller blades independently from the second set of propeller blades.

9. A method of operating a rotary-powered vehicle with the control system of claim 5 comprising:
controlling the thrust production control subsystem, comprising:
rotating, via the first power source, the first rotary shaft such that the first set of propeller blades connected to the first rotary shaft move at a first angular velocity;
rotating, via the second power source, the second rotary shaft such that the second set of propeller blades connected to the second rotary shaft move at a second angular velocity; and
controlling the position control subsystem, comprising:
moving the first mass between the first position and the second position.

10. The method of operating a rotary-powered vehicle of claim 9 wherein controlling the position control subsystem further comprises moving a second mass between a third position and a fourth position.

11. The method of operating a rotary-powered vehicle of claim 9, wherein the first set of propeller blades and the second set of propeller blades are coaxial.

12. The method of operating a rotary-powered vehicle of claim 9, wherein the first set of propeller blades are coplanar with the second set of propeller blades.

13. The vehicle control system of claim 3 further comprising a transceiver in electrical communication with the first power source and configured to receive a wireless signal to adjust an angular velocity of the first set of propeller blades.

14. The vehicle control system of claim 3 further comprising a transceiver in electrical communication with the first power source and a linear motor of the position control subsystem, wherein the transceiver is configured to receive a wireless signal to:
adjust an angular velocity of the first set of propeller blades; and
move, via the linear motor, the first mass between the first position and the second position.

15. The vehicle control system of claim 1, wherein the position control subsystem further comprises a linear motor configured to move the first mass between the first position and the second position.

16. A method of operating a rotary-powered vehicle comprising:
controlling a control system comprising:
a position control subsystem configured to change one or more moments of the rotary-powered vehicle in flight selected from the group consisting of a rolling moment, a pitching moment, a yaw moment, and a combination thereof; and
a thrust production control subsystem configured to change one or more aerodynamic forces of the rotary-powered vehicle in flight selected from the group consisting of lift, drag, and a combination thereof
wherein controlling the control system comprises:
receiving, at a flight controller, a reference trajectory comprising a reference attitude and a reference position, wherein the reference attitude further comprises a reference angular velocity for a first rotary shaft of the position control subsystem and a reference angular acceleration for the first rotary shaft;
receiving, at a state-estimator controller, data indicative of an attitude and a position of the rotary-powered vehicle;
tracking, via a position controller, the reference position;
calculating a first set of instructions, based at least in part on the reference position, to control the position control subsystem;
adjusting, based at least in part on the first set of instructions, a position of a first mass of the position control subsystem;
tracking, via an attitude controller, the reference angular velocity for the first rotary shaft and the reference angular acceleration for the first rotary shaft;
calculating a second set of instructions, based at least in part on the reference angular velocity for the first rotary shaft or the reference angular acceleration for the first rotary shaft, to adjust at least one of a first-rotary-shaft angular velocity or a first-rotary-shaft angular acceleration;
adjusting, via a first power source of thrust production control subsystem and based at least in part on the second set of instructions, at least one of the first-rotary- shaft angular velocity or the first-rotary-shaft angular acceleration;
receiving, at an actuator controller, at least one of a desired position, a desired speed, or a desired attitude for the rotary-powered vehicle;
calculating a third set of instructions, based at least in part on the desired position, the desired speed, or the desired attitude, to alter at least one of the position of the rotary-powered vehicle, the first-rotary-shaft angular velocity, or the first-rotary- shaft angular acceleration;
adjusting, based at least in part on the third set of instructions, the position of the first mass; and
adjusting, via the first power source and based at least in part on the third set of instructions, at least one of the first-rotary-shaft angular velocity or the first-rotary-shaft angular acceleration.

17. The method of operating a rotary-powered vehicle of claim 16 further comprising:
adjusting, based at least in part on the first set of instructions, a position of a second mass of the position control subsystem; and
adjusting, based at least in part on the third set of instructions, the position of the second mass.

18. The method of operating a rotary-powered vehicle of claim 16, wherein:
the reference attitude further comprises a reference angular velocity for a second rotary shaft of the of thrust production control subsystem and a reference angular acceleration for the second rotary shaft;
the second set of instructions is further based at least in part on the reference angular velocity for the second rotary shaft or the reference angular acceleration for the second rotary shaft;
the second set of instructions include instructions to adjust at least one of a second-rotary-shaft angular velocity or a second-rotary-shaft angular acceleration; and
the method further comprises:
tracking, via the attitude controller, the reference angular velocity for the second rotary shaft and the reference angular acceleration for the second rotary shaft;
adjusting, via the first power source and based at least in part on the second set of instructions, at least one of the second-rotary-shaft angular velocity or the second-rotary-shaft angular acceleration;
calculating a fourth set of instructions, based at least in part on the desired position, the desired speed, or the desired attitude, to alter at least one of the second-rotary-shaft angular velocity or the second-rotary-shaft angular acceleration; and
adjusting, based at least in part on the fourth set of instructions, the second-rotary-shaft angular velocity or the second-rotary-shaft angular acceleration.

19. In a vehicle control system for a vehicle having one or more rotary assemblies used for controlled flight, the vehicle control system comprising:
a coupled system of position control and thrust production control;
wherein controlled flight of the vehicle includes at least:
one or more changes in one or more moments selected from the group consisting of a rolling moment, a pitching moment, a yaw moment, and a combination thereof; and
one or more changes in one or more aerodynamic forces selected from the group consisting of lift, drag, and a combination thereof; and
wherein controlled flight of the vehicle is solely dependent on a change of thrust production of one or more of the rotary assemblies;
the improvement comprising:
uncoupling the position control and thrust production control into separate subsystems, a position control subsystem and a thrust production control subsystem;
wherein one or more changes in one or more of the changes in one or more moments of the vehicle in flight is at least partially dependent upon a change of a center of gravity of the vehicle in flight, which is controlled by the position control subsystem; and
wherein one or more changes in the one or more aerodynamic forces of the vehicle in flight is dependent upon a change of thrust production of one or more of the rotary assemblies, which is controlled by the thrust production control subsystem.

* * * * *